US011733718B2

(12) United States Patent
Mihara

(10) Patent No.: US 11,733,718 B2
(45) Date of Patent: Aug. 22, 2023

(54) VALVE DEVICE

(71) Applicant: PIOLAX, INC., Kanagawa (JP)

(72) Inventor: Kenta Mihara, Kanagawa (JP)

(73) Assignee: PIOLAX, INC., Kanagawa (JP)

( * ) Notice: Subject to any disclaimer, the term of this patent is extended or adjusted under 35 U.S.C. 154(b) by 377 days.

(21) Appl. No.: 17/046,459

(22) PCT Filed: Apr. 3, 2019

(86) PCT No.: PCT/JP2019/014824
§ 371 (c)(1),
(2) Date: Oct. 9, 2020

(87) PCT Pub. No.: WO2019/198596
PCT Pub. Date: Oct. 17, 2019

(65) Prior Publication Data
US 2021/0157339 A1    May 27, 2021

(30) Foreign Application Priority Data

Apr. 11, 2018  (JP) .................................. 2018-076252
Aug. 9, 2018   (JP) .................................. 2018-150777

(51) Int. Cl.
G05D 7/01      (2006.01)
B60K 15/035    (2006.01)
(Continued)

(52) U.S. Cl.
CPC .......... G05D 7/0146 (2013.01); B60K 15/035 (2013.01); F16K 24/04 (2013.01); F16K 24/06 (2013.01); B60K 2015/03289 (2013.01)

(58) Field of Classification Search
CPC ... F16K 24/04; F16K 24/06; B60K 15/03519; B60K 2015/03289; B60K 15/035; B60K 2015/03447; G05D 7/0146
See application file for complete search history.

(56) References Cited

U.S. PATENT DOCUMENTS 5,738,132 A      4/1998  Zakai et al.
2014/0216573 A1  8/2014  Yamaguchi
(Continued)

FOREIGN PATENT DOCUMENTS

CN   101881225 A   11/2010
CN   202545913 U   11/2012
(Continued)

OTHER PUBLICATIONS

May 28, 2019, International Search Report issued for related PCT application No. PCT/JP2019/014824.
(Continued)

Primary Examiner — Atif H Chaudry
(74) Attorney, Agent, or Firm — Paratus Law Group, PLLC

(57) ABSTRACT

There is provided a valve device, including: a housing in which, via a partition wall, a valve chamber is provided below the partition wall and a vent chamber is provided above the partition wall, and a vent hole through which the valve chamber and the vent chamber communicate with each other is provided in the partition wall; and a float valve. A valve seat is formed on a side of the valve chamber of the partition wall, and an opening is provided on an inner side of the valve seat. The opening includes a first opening and a second opening extending outward in a slit shape from an outer periphery of the first opening. A seal part having elasticity that contacts with and separates from the valve seat to close and open the first opening and the second opening, is disposed above the float valve.

8 Claims, 22 Drawing Sheets

(51) Int. Cl.
    *F16K 24/06*     (2006.01)
    *F16K 24/04*     (2006.01)
    *B60K 15/03*     (2006.01)

(56) References Cited

U.S. PATENT DOCUMENTS

| | | |
|---|---|---|
| 2015/0096931 A1 | 4/2015 | Jensen |
| 2016/0091107 A1 | 3/2016 | Kaneko et al. |
| 2017/0030301 A1 | 2/2017 | Fujisaki |
| 2017/0158047 A1 | 6/2017 | Walkowski |

FOREIGN PATENT DOCUMENTS

| | | |
|---|---|---|
| CN | 103764992 A | 4/2014 |
| CN | 105465444 A | 4/2016 |
| CN | 105683556 A | 6/2016 |
| CN | 106401817 A | 2/2017 |
| CN | 106715177 A | 5/2017 |
| EP | 3183136 A1 | 6/2017 |
| JP | H04-052929 U | 5/1992 |
| JP | H08-254278 A | 10/1996 |
| JP | 2010-076467 A | 4/2010 |

OTHER PUBLICATIONS

May 28, 2019, International Search Opinion issued for related PCT application No. PCT/JP2019/014824.
May 6, 2022, Chinese Office Action issued for related CN Application No. 201980039213.6.
Nov. 26, 2021, Chinese Office Action issued for related CN Application No. 201980039213.6.
Nov. 24, 2021, European Search Report issued for related EP Application No. 19785249.4.

VALVE DEVICE

CROSS REFERENCE TO PRIOR APPLICATION

This application is a National Stage Patent Application of PCT International Patent Application No. PCT/JP2019/014824 (filed on Apr. 3, 2019) under 35 U.S.C. § 371, which claims priority to Japanese Patent Application Nos. 2018-076252 (filed on Apr. 11, 2018) and 2018-150777 (filed on Aug. 9, 2018), which are all hereby incorporated by reference in their entirety.

TECHNICAL FIELD

The present invention relates to a valve device that is to be attached to a fuel tank of an automobile or the like, and that is used as a fuel outflow prevention valve, a filling-up restriction valve, or the like.

BACKGROUND ART

For example, a valve device that prevents fuel in a fuel tank from leaking out of the fuel tank when the vehicle is inclined or overturned is attached to a fuel tank of a vehicle such as an automobile.

Such a valve device generally includes a housing and a float valve. In the housing, by a partition wall having a vent hole, a vent chamber is formed above the partition wall and a valve chamber is formed below the partition wall. The float valve is disposed so as to be able to move up and down in the valve chamber. Further, when the fuel sloshes and buoyancy is applied to the float valve, the float valve is lifted to come into contact with a valve seat provided around the vent hole to close the vent hole, so that fuel inflow to the vent chamber side is restricted. Thereafter, when the sloshing of the fuel is stopped and the buoyancy is not applied to the float valve, the float valve is lowered due to its own weight to be separated from the valve seat, and the vent hole is opened again.

However, in a state where an internal pressure of the tank is high, the float valve may be stuck to the valve seat, and the vent hole may not be opened. In particular, in a case where a seal part made of rubber or the like is provided above the float valve, the tendency is strong. Therefore, even in the state where the internal pressure of the tank is high, it is desired that the float valve can be easily peeled off from the valve seat and the vent hole can be opened, that is, a valve reopening pressure can be increased.

For example, the following Patent Literature 1 discloses a vent valve including a housing and a float member. The housing includes a partition wall, and is provided with a vent chamber above the partition wall and a valve chamber below the partition wall. The float member is disposed in the valve chamber so as to be able to move up and down. A rim protruding downward and extending elongated is provided on a lower surface of the ceiling wall, and a lower end surface of the rim is obliquely cut to form a valve seat, and an elongated slit-shaped outlet opening is formed on an inner side of the valve seat. On the other hand, an elongated strip-shaped soft film piece is fixed to an upper wall of the float member via a fixing stud.

CITATION LIST

Patent Literature

Patent Literature 1: JP-A-H8-254278

SUMMARY OF INVENTION

Technical Problem

In the vent valve of Patent Literature 1, the slit-shaped outlet opening is provided on the inner side of the valve seat and an opening width of the valve seat is small, and thus in a case where the float member is lifted and the strip-shaped soft film piece comes into contact with the valve seat and thereafter the float member is about to be lowered, the soft film piece is easily peeled off from the valve seat and the valve reopening pressure is relatively high. However, since the opening width of the valve seat is small, air permeability for circulating fuel vapor or air, through the vent hole, between the vent chamber provided above the partition wall and the valve chamber provided below the partition wall, is reduced. When the opening width of the valve seat is increased, the air permeability is increased, but the float is easily stuck to the valve seat at the time of being lowered and the valve reopening pressure is reduced. As described above, it is difficult to maintain air permeability and increase a valve reopening pressure.

Accordingly, an object of the present invention is to provide a valve device capable of easily maintaining air permeability and increasing a valve reopening pressure.

Solution to Problem

In order to achieve the above object, a valve device according to the present invention includes: a housing in which, via a partition wall, a valve chamber communicating with an inside of a fuel tank is provided below the partition wall and a vent chamber communicating with an outside of the fuel tank is provided above the partition wall, and a vent hole through which the valve chamber and the vent chamber communicate with each other is provided in the partition wall; and a float valve that is accommodated in the valve chamber so as to be able to move up and down and that opens and closes the vent hole. A valve seat is formed on a side of the valve chamber of the partition wall, and an opening communicating with the vent hole is provided on an inner side of the valve seat. The opening includes a first opening and a second opening extending outward in a slit shape from at least one position of an outer periphery of the first opening. A seal part having elasticity that contacts with and separates from the valve seat to close and open the first opening and the second opening, is disposed above the float valve.

Advantageous Effects of Invention

According to the present invention, since the opening includes the first opening and the second opening extending outward in a slit shape from at least one position of the outer periphery of the first opening, when the float valve is lowered, the ventilation volume between the valve chamber and the vent chamber can be secured with both the first opening and the second opening. On the other hand, when there is no buoyance applied to the float valve from a state where the float valve is lifted by buoyance due to fuel immersion caused by fuel sloshing or the like and the seal part comes into contact with the valve seat, the seal part can be easily peeled off from the second opening side of the valve seat due to the second opening extending in a slit shape and a valve reopening pressure can be increased. As a result, it is possible to easily maintain air permeability and increase the valve reopening pressure.

Figure 18:
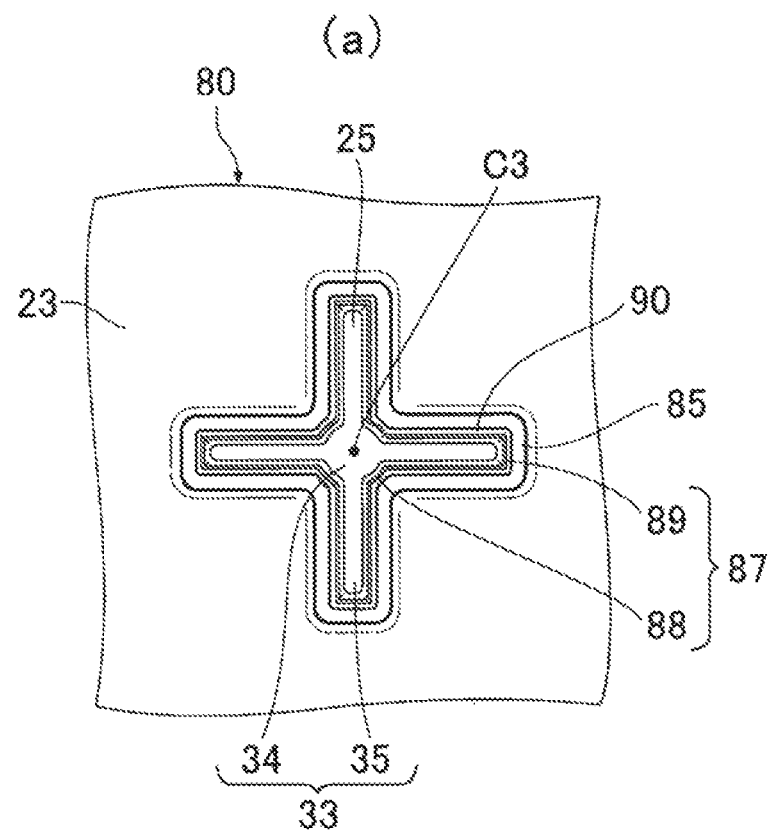
Figure 18:
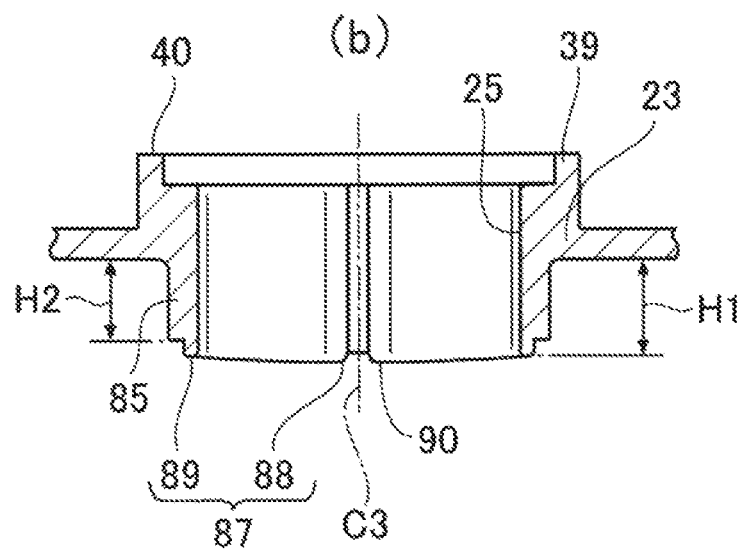

(a) of FIG. 18 is a plan view of the cylindrical wall forming member, and (b) of FIG. 18 is a cross-sectional view of the cylindrical wall forming member.

Figure 19:
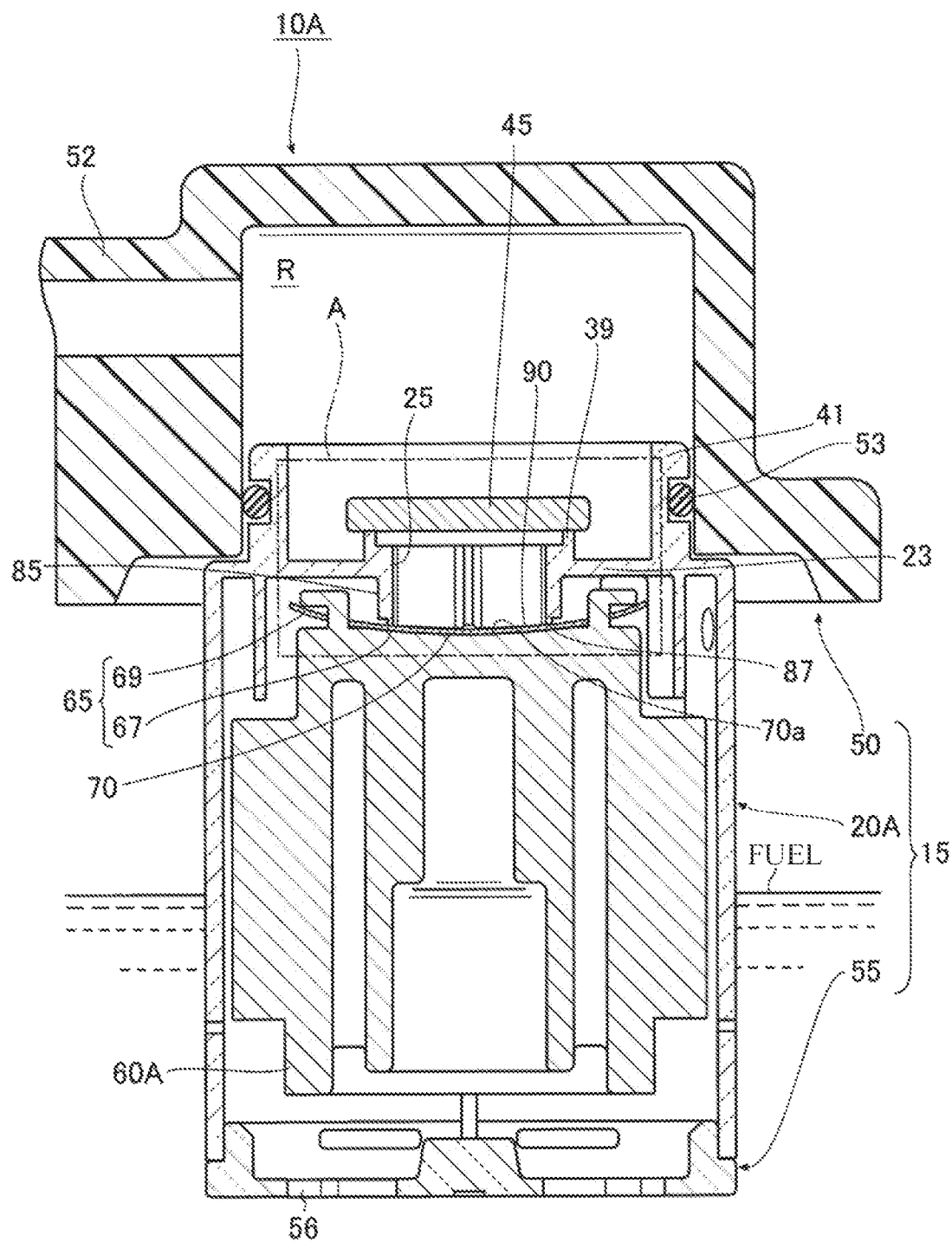

FIG. 19 is a cross-sectional view of the valve device in a state where the float valve is lifted and the vent hole is closed.

Figure 20:
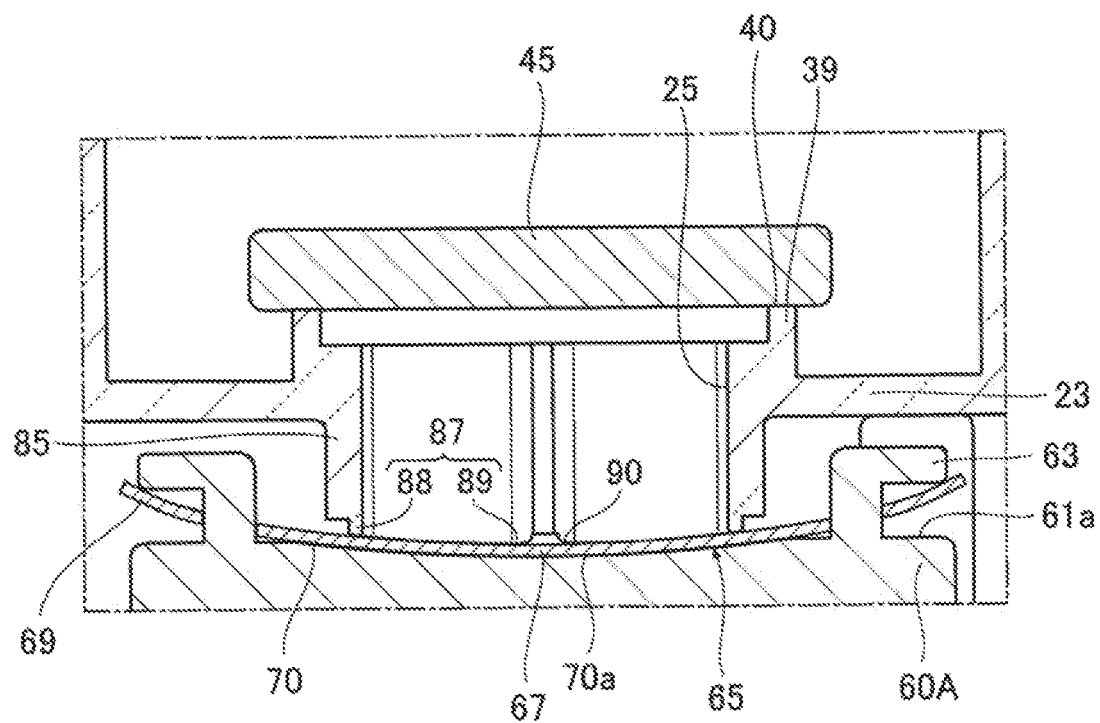

FIG. 20 is an enlarged view of a part A in FIG. 19.

Figure 21:
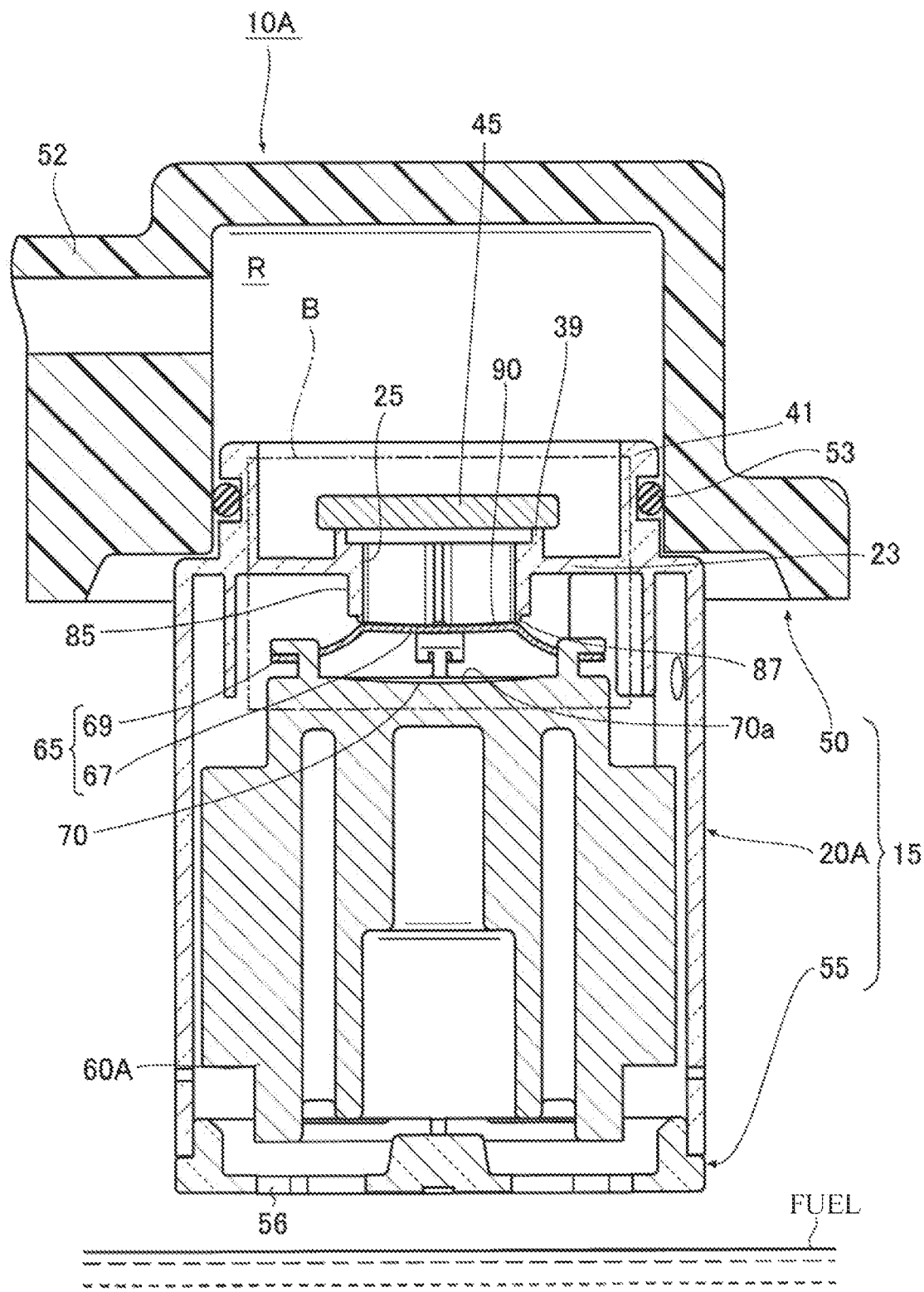

FIG. 21 is a cross-sectional view of the valve device in a state where the float valve is about to be lowered from a state where the float valve closes the vent hole.

Figure 22:
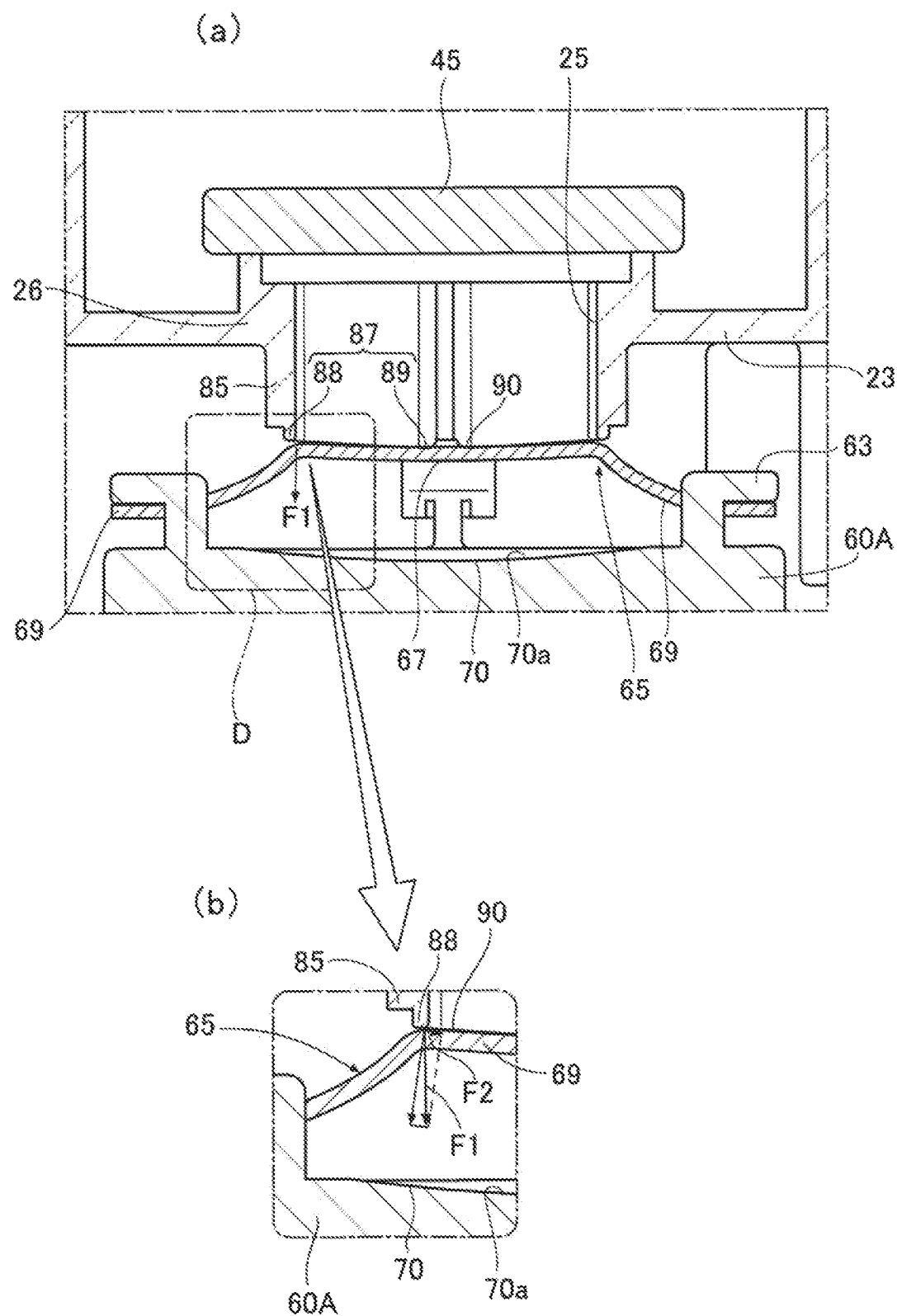

(a) of FIG. 22 is an enlarged view of a part B in FIG. 21, and (b) of FIG. 22 is an enlarged view of a part D in (a) of FIG. 22.

DESCRIPTION OF EMBODIMENTS

Hereinafter, an embodiment of a valve device according to the present invention will be described with reference to the drawings. In the following description, the term "fuel" refers to a liquid fuel (including fuel droplets), and the term "fuel vapor" refers to vaporized fuel. The valve device is a fuel tank valve device to be attached to a fuel tank of a vehicle such as an automobile.

Figure 1:
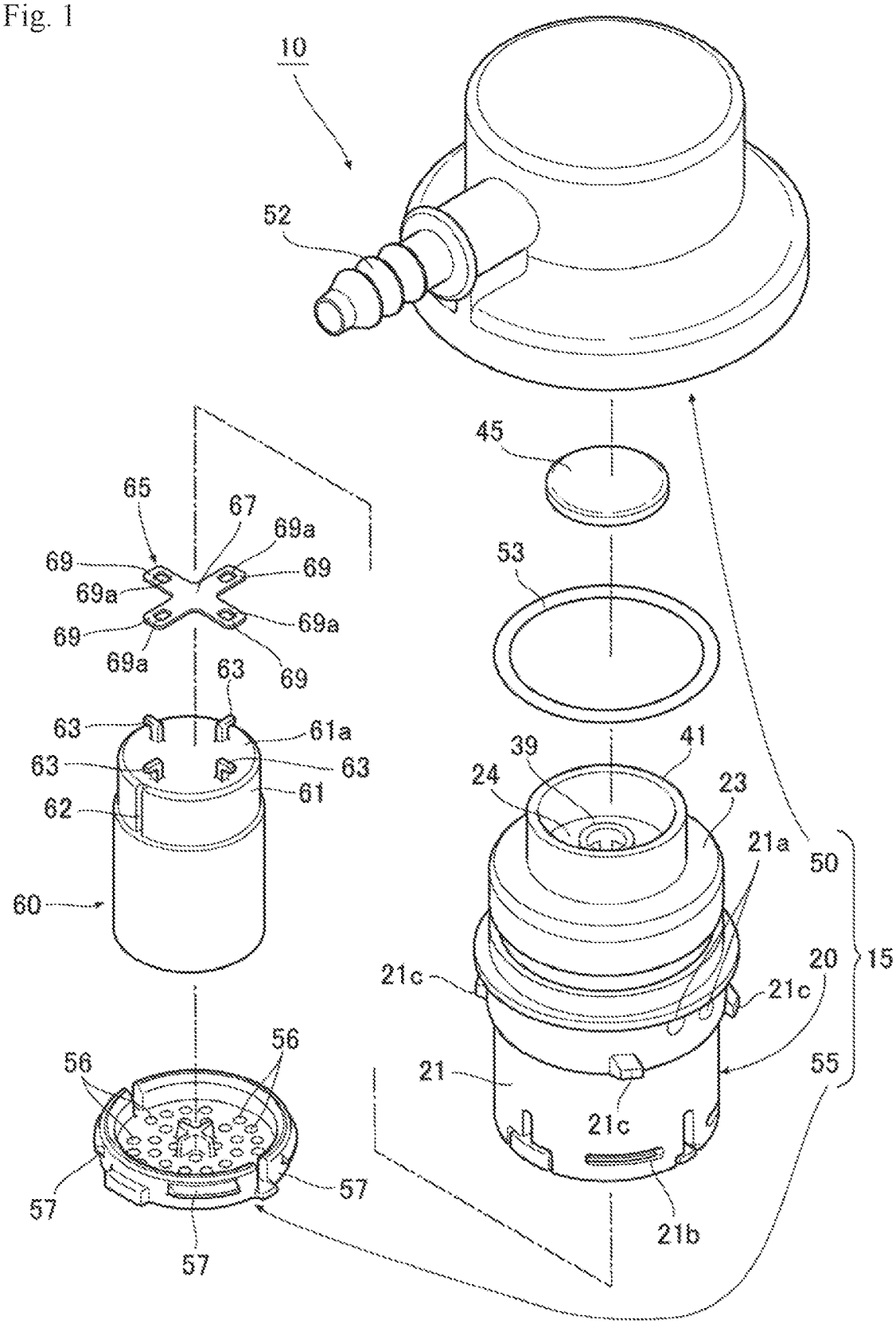
FIG. 1 is an exploded perspective view illustrating an embodiment of a fuel tank valve device according to the present invention.

As illustrated in FIG. 1, a valve device 10 according to this embodiment has a substantially tubular shape and includes a housing 15. The housing 15 includes a housing body 20 provided with a partition wall 23 at an upper portion, a cover 50 mounted on an upper side of the housing body 20, and a cap 55 mounted on a lower side of the housing body 20.

As illustrated in FIG. 1, the housing body 20 includes a peripheral wall 21 having a substantially cylindrical shape, and the partition wall 23 is disposed on an upper side of the peripheral wall 21. A plurality of through holes 21a are formed in the peripheral wall 21, and a locking hole 21b is formed in a lower portion of the peripheral wall 21. A locking projection 21c projects at an upper side of the peripheral wall 21.

On the other hand, the cap 55 has a plurality of through holes 56, and is formed with a plurality of locking claws 57 on an outer periphery thereof. The cap 55 is mounted on the lower side of the housing body 20 by locking the locking claws 57 of the cap 55 to the locking holes 21b of the housing body 20. As a result, a valve chamber V communicating with an inside of a fuel tank (not shown) is formed in a lower portion of the housing via the partition wall 23 (see FIG. 5). In the valve chamber V, a float valve 60, above which a seal part 65 having elasticity is disposed, is disposed so as to be able to move up and down (see FIG. 5).

Figure 7:
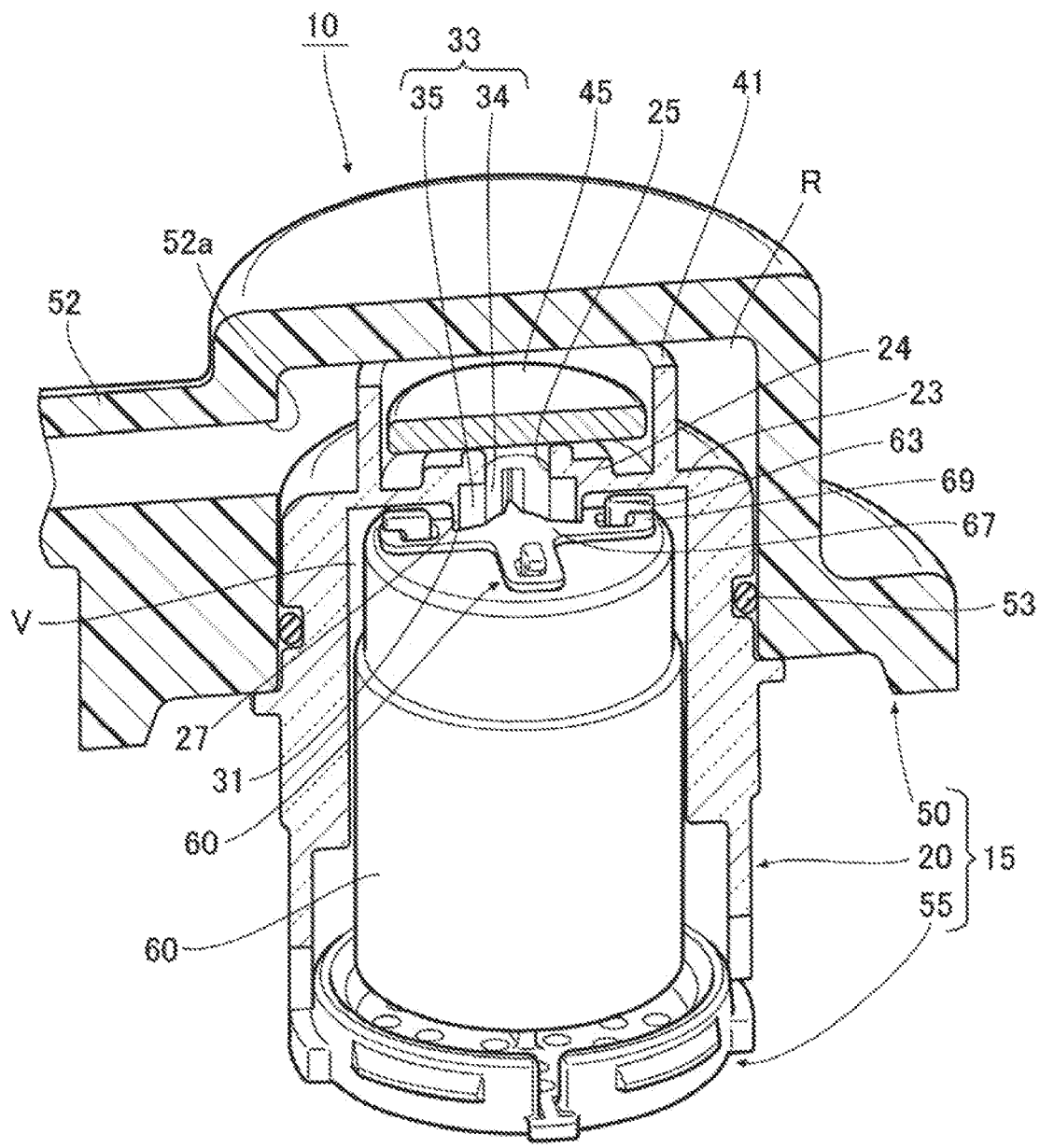
FIG. 7 is a cross-sectional perspective view of the valve device in a state where the float valve is lifted and the vent hole is closed.

As illustrated in FIGS. 1 and 7, the cover 50 has a substantially hat shape in which an upper portion of the cover 50 is blocked and a lower peripheral edge portion thereof spreads in a flange shape. At a predetermined portion of a peripheral wall 51 of the cover 50, a vent port 52a (see FIG. 5) is formed, and a fuel vapor piping 52 having a substantially cylindrical shape extends outward from an outer peripheral edge portion of the vent port 52a. A tube (not shown) that communicates with a canister or the like disposed outside the fuel tank (not shown) is connected to the fuel vapor piping 52.

Further, in a state where a seal ring 53 is attached to an outer periphery of an upper side of the housing body 20, the cover 50 is covered from above to sandwich the seal ring 53 therebetween, and a locking piece (not shown) of the cover 50 is locked to the locking projection 21c of the housing body 20, so that the cover 50 is attached to the upper side of the housing body 20. As a result, via the partition wall 23, a vent chamber R communicating with an outside of the fuel tank is formed above the partition wall 23 (see FIG. 5).

Figure 5:
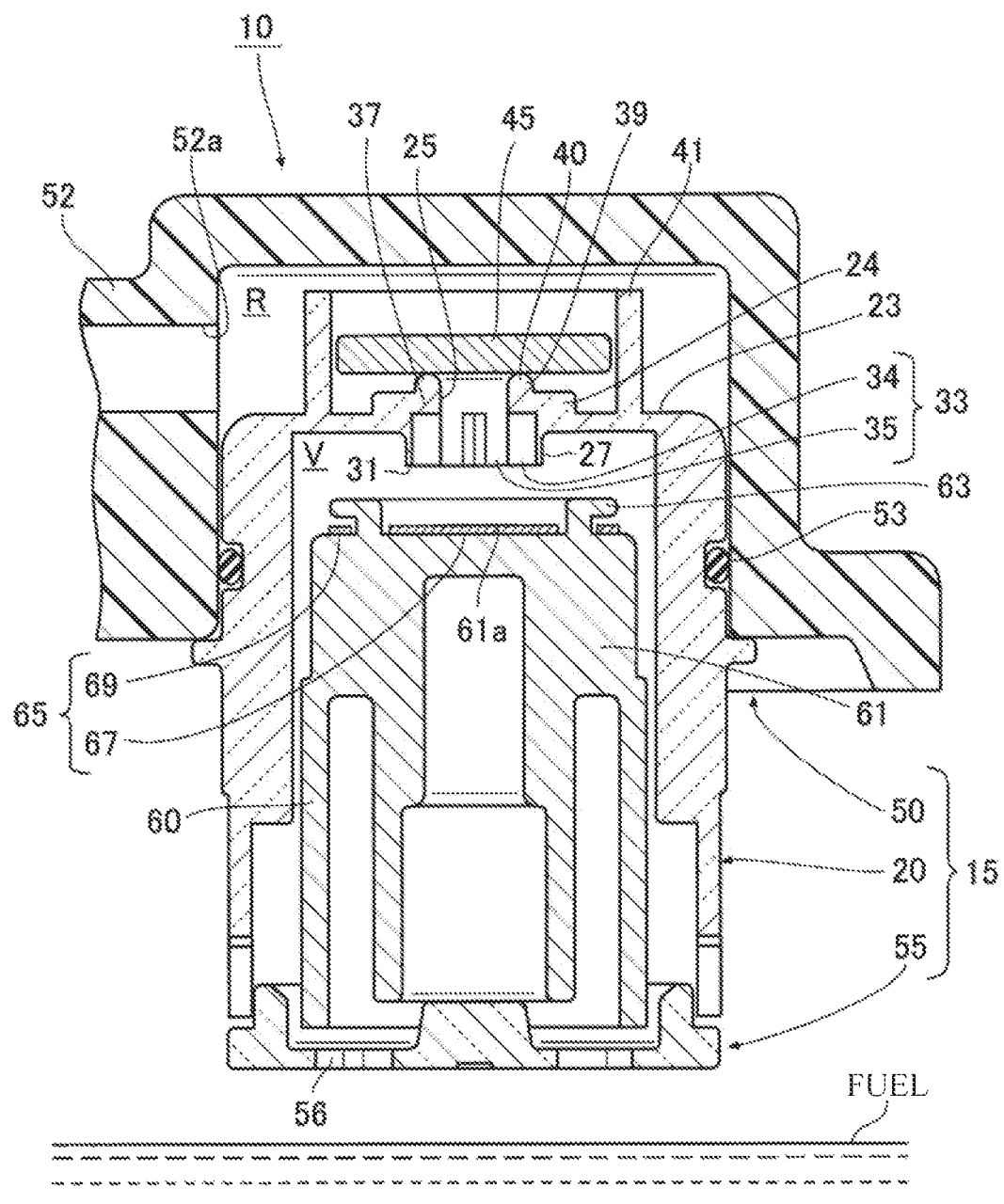
FIG. 5 is a cross-sectional view of the valve device in a state where the float valve is lowered and the vent hole is opened.
Figure 10:
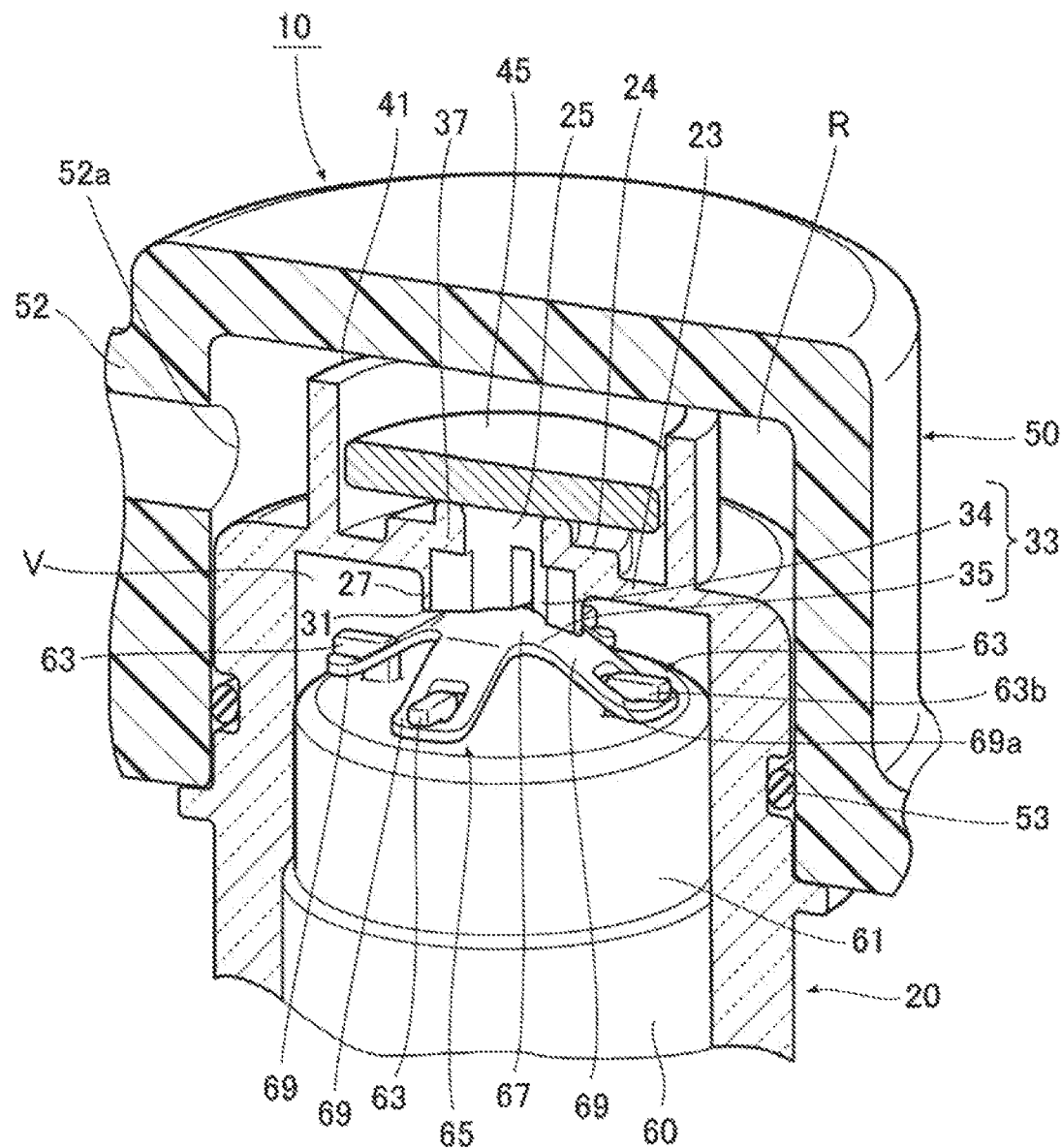
FIG. 10 is a cross-sectional perspective view illustrating a state where the float valve is further lowered from the state of FIG. 8.

Returning to the description of the housing body 20, as illustrated in FIGS. 5, 7, 10, and the like, the partition wall 23 in this embodiment has a substantially circular plate shape and is disposed at an inner periphery of an upper opening of the peripheral wall 21, and has a protruding portion 24 protruding in a circular shape at a predetermined height toward the vent chamber R in a central portion thereof. Further, at a center of the protruding portion 24 of the partition wall 23, a vent hole 25 having a circular shape is formed, and the valve chamber V and the vent chamber R communicate with each other through the vent hole 25. For example, the partition wall may be provided midway in an axial direction of the peripheral wall 21 of the housing body 20. The partition wall may have simply a circular plate shape or the like, or may have a shape such that the central portion thereof protrudes in a tubular shape and a wall portion (shoulder wall portion) provided at a peripheral edge portion thereof has a stepped shape. The position and shape thereof are not particularly limited.

Figure 2:
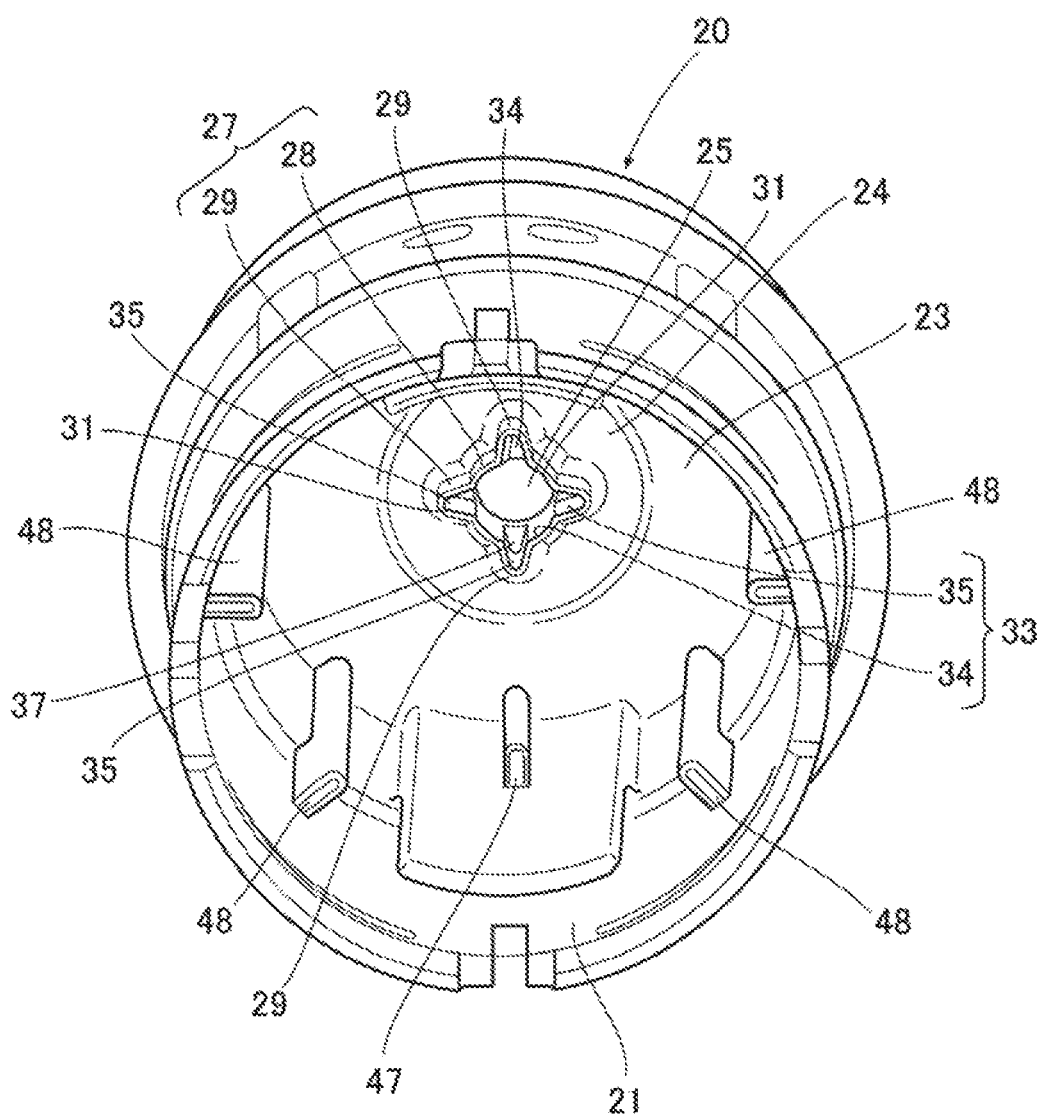
FIG. 2 is a perspective view of a housing constituting the valve device.

As illustrated in FIGS. 2 and 5, a cylindrical wall 27 protrudes downward from a surface of the partition wall 23 on the valve chamber V side (a lower surface side in a thickness direction of the partition wall 23) so as to surround the vent hole 25.

Figure 3:
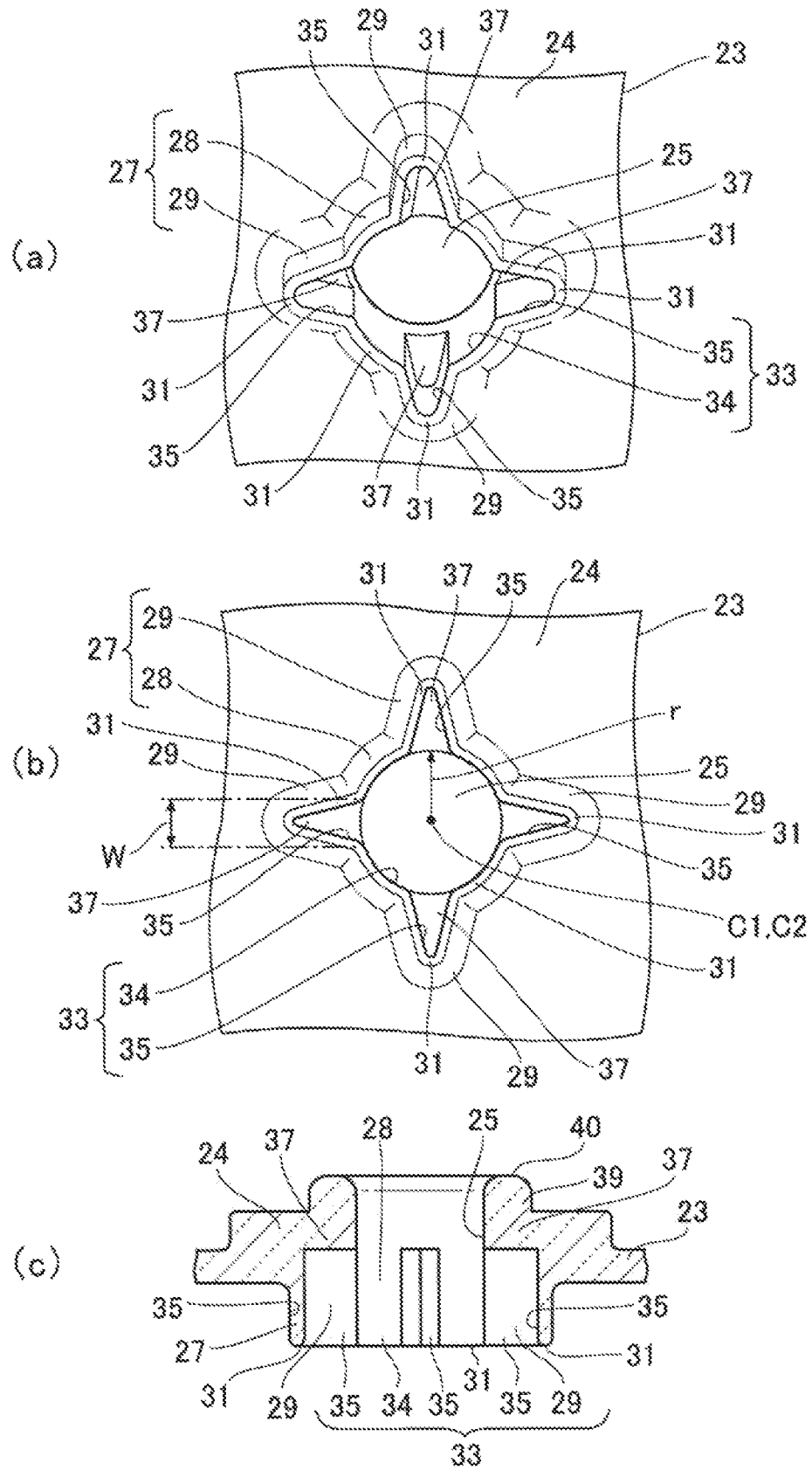
FIG. 3 illustrates a vent hole and an opening that are main parts of the valve device, in which (a) of FIG. 3 is an enlarged perspective view thereof, (b) of FIG. 3 is a bottom view thereof, and (c) of FIG. 3 is a cross-sectional view thereof.

Referring also to (a) and (b) of FIG. 3, the cylindrical wall 27 of this embodiment is a surface on the valve chamber V side of the partition wall 23, and includes a first wall portion 28 having a substantially cylindrical shape and protruding from a portion located at a peripheral edge of the vent hole 25, and a plurality of second wall portions 29 (four in this case) extending outward from an outer periphery of the first wall portion 28 and spaced apart at equal intervals in a circumferential direction.

As illustrated in (b) of FIG. 3, when viewing the partition wall 23 from the valve chamber V side along the axial direction of the housing 15, each of the second wall portions 29 has a shape of a beak that extends along a straight line passing through a center C1 of the first wall portion 28 and that is wide at a base end side in an extending direction and gradually narrows toward a tip end side in the extending direction. The tip end side of each second wall portion 29 in the extending direction has a slightly rounded shape. As illustrated in (c) of FIG. 3, an inner peripheral shape of the first wall portion 28 and an inner peripheral shape of each second wall portion 29 are constant from a base end side of the cylindrical wall 27 in a protruding direction to a tip end side in the protruding direction.

Further, a tip end portion of the cylindrical wall 27 in the protruding direction constitutes a valve seat 31, the seal part 65 of the float valve 60 contacting with and separating from the valve seat 31. On an inner side of the valve seat 31, an opening 33 communicating with the vent hole 25 is provided. As illustrated in FIG. 3, the opening 33 in this embodiment includes a first opening 34 having a substantially circular shape and provided on an inner side of the first wall portion 28 of the cylindrical wall 27, and a plurality of second openings 35 (four in this case) provided on an inner side of each second wall portion 29 of the cylindrical wall 27, extending outward in a slit shape from an outer periphery of the first opening 34, and spaced apart at equal intervals in the circumferential direction. The first opening 34 is formed at a position aligned with the vent hole 25 and communicates with the vent hole 25. The plurality of second openings 35 continuously extend from the outer periphery of the first opening 34 so as not to be interrupted. The first opening 34 and the plurality of second openings 35 communicate with each other, and form one large opening 33 that is expanded to be wider than the vent hole 25 as a whole.

Further, as illustrated in (b) of FIG. 3, when viewing the partition wall 23 from the valve chamber V side along the axial direction of the housing 15, each second opening 35 is slit-like shape having a shape of an elongated triangle that extends along a straight line passing through a center C2 of the first opening 34 and that is wide at a base end side in an extending direction and gradually narrows toward a tip end side in the extending direction.

The first opening 34 and each second opening 35 in this embodiment are formed in constant shapes along the protruding direction of the cylindrical wall 27 and at a predetermined depth, in correspondence with the inner peripheral shapes of the first wall portion 28 and each second wall portion 29 being constant from the base end side of the cylindrical wall 27 in the protruding direction to the tip end side in the protruding direction.

Further, as illustrated in (b) of FIG. 3, an opening width W of the second opening 35 on the base end side in the extending direction, which is formed to be wide, in this embodiment is formed to be narrower than a radius r of the first opening 34 having a circular shape (W>r).

The number of the second openings 34 may be one, two, three, or five or more, and is not particularly limited. It is preferable that three or more second openings 35 are arranged at equal intervals in the circumferential direction of the first opening 34.

Further, as illustrated in (a) to (c) of FIG. 3, a cover portion 37 that covers an interior end surface of the second opening 35 is provided at a predetermined position of the inner side of the valve seat 31 on a vent chamber R side. In this embodiment, a plurality of cover portions 37 (four in this case) having a substantially triangular plate shape are provided at positions of a peripheral edge of the vent hole 25 on the vent chamber R side, which are on the inner side of the valve seat 31 and which are aligned with the plurality of second openings 35, and are spaced apart at equal intervals along the circumferential direction. Therefore, as illustrated in (b) of FIG. 3, when viewing the partition wall 23 from the valve chamber V side along the axial direction of the housing 15, the cover portions 37 are seen disposed on the interior end surface of the second openings 35. However, since the second openings 35 communicate with the first opening 34 and the first opening 34 communicates with the vent hole 25, the second openings 35 also communicate with the vent hole 25 via the first opening 34.

That is, the vent hole 25, which is formed in the partition wall 23 and through which the valve chamber V and the vent chamber R communicate with each other, has a shape in which an opening portion on the valve chamber V side in a thickness direction of the partition wall 23 is expanded by the second opening 35, and it can be said that the vent hole 25 has the opening 33 expanded toward the valve chamber V side of the partition wall 23.

Further, as illustrated in (c) of FIG. 3, an annular projection 39 projects from the peripheral edge of the vent hole 25. The annular projection 39 is on an upper surface on the vent chamber R side of the protruding portion 24 of the partition wall 23, communicates with the vent hole 25, and has an annular shape to surround the vent hole 25. An upper end portion 40 of the annular projection 39 constitutes a valve seat, a check valve 45 (see FIG. 5) made of metal and having a disk-like shape contacting with and separating from the valve seat. Normally, the check valve 45 is lowered due to its own weight and comes into contact with the upper end portion 40 of the annular projection 39, which forms the valve seat. When an internal pressure of the fuel tank (not shown) rises, the check valve 45 is lifted by the pressure and is separated from the upper end portion 40 of the annular projection 39, and the fuel vapor is discharged from the valve chamber V side to the vent chamber R side to lower the internal pressure of the fuel tank.

As illustrated in FIGS. 1 and 5, an annular wall 41 having an annular shape is provided from an upper surface on the vent chamber R side of the partition wall 23 and an outer periphery of the protruding portion 24. The check valve 45 is disposed on an inner side of the annular wall 41, so that upward and downward movement of the check valve 45 is guided.

Further, as illustrated in FIG. 2, at predetermined positions on an inner periphery of an upper side of the peripheral wall 21 of the housing body 20, a rotation restricting projection 47 constituting a protruding strip and a plurality of guide projections 48 constituting protruding strips in the same manner, extend along the axial direction of the housing 15.

Figure 11:
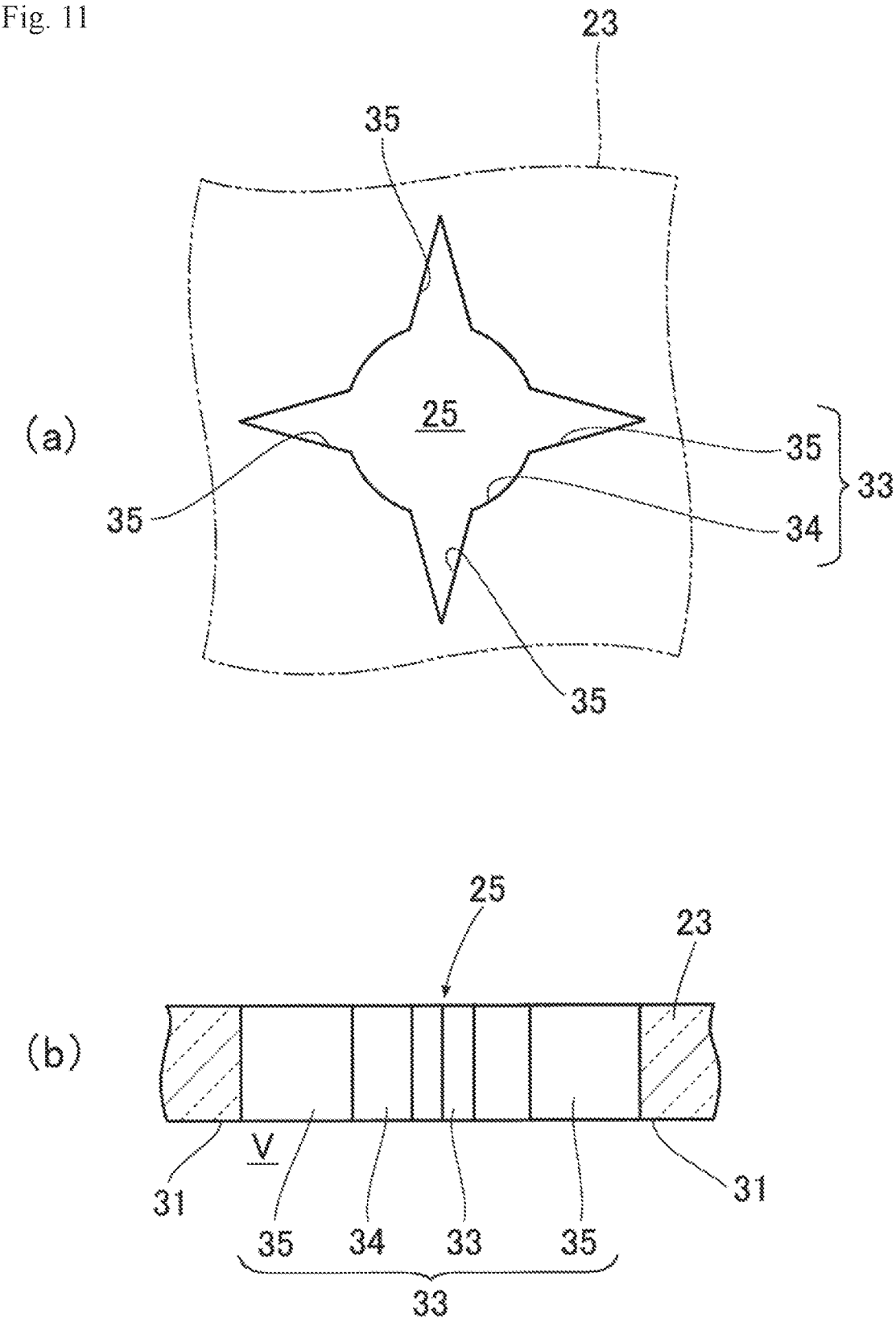
FIG. 11 illustrates other structure of the vent hole and opening in the valve device, in which (a) of FIG. 11 is a bottom view thereof, and (b) of FIG. 11 is a cross-sectional view thereof.

Although as described above, the opening 33 in this embodiment has a shape such that the interior end surface of the plurality of second openings 35 are blocked by the cover portion 37, the opening 33 may have a shape such that the second openings 35 are not blocked. For example, as illustrated in (a) and (h) of FIG. 11, a plurality of cutout grooves having an inner peripheral shape aligned with the second openings 35 of the opening 33 may be formed on an outer periphery of the vent hole 25, being spaced apart at equal intervals in the circumferential direction. The first opening 34 and the plurality of second openings 35, which form the opening 33, and the vent hole 25 may be set to have shapes aligned with each other to have a hole shape penetrating along the thickness direction of the partition wall 23, in this case, a peripheral edge portion of the opening 33 on a lower surface on the valve chamber V side of the partition wall 23 constitutes the valve seat 31.

In addition, in this embodiment, the opening 33 includes the first opening 34 in a circular shape and four second openings 35 extending in a substantially triangular slit shape from the outer periphery thereof and spaced apart at equal intervals in the circumferential direction, but is not limited to this shape. FIGS. 12 to 15 illustrate such differently shaped openings.

Figure 12:
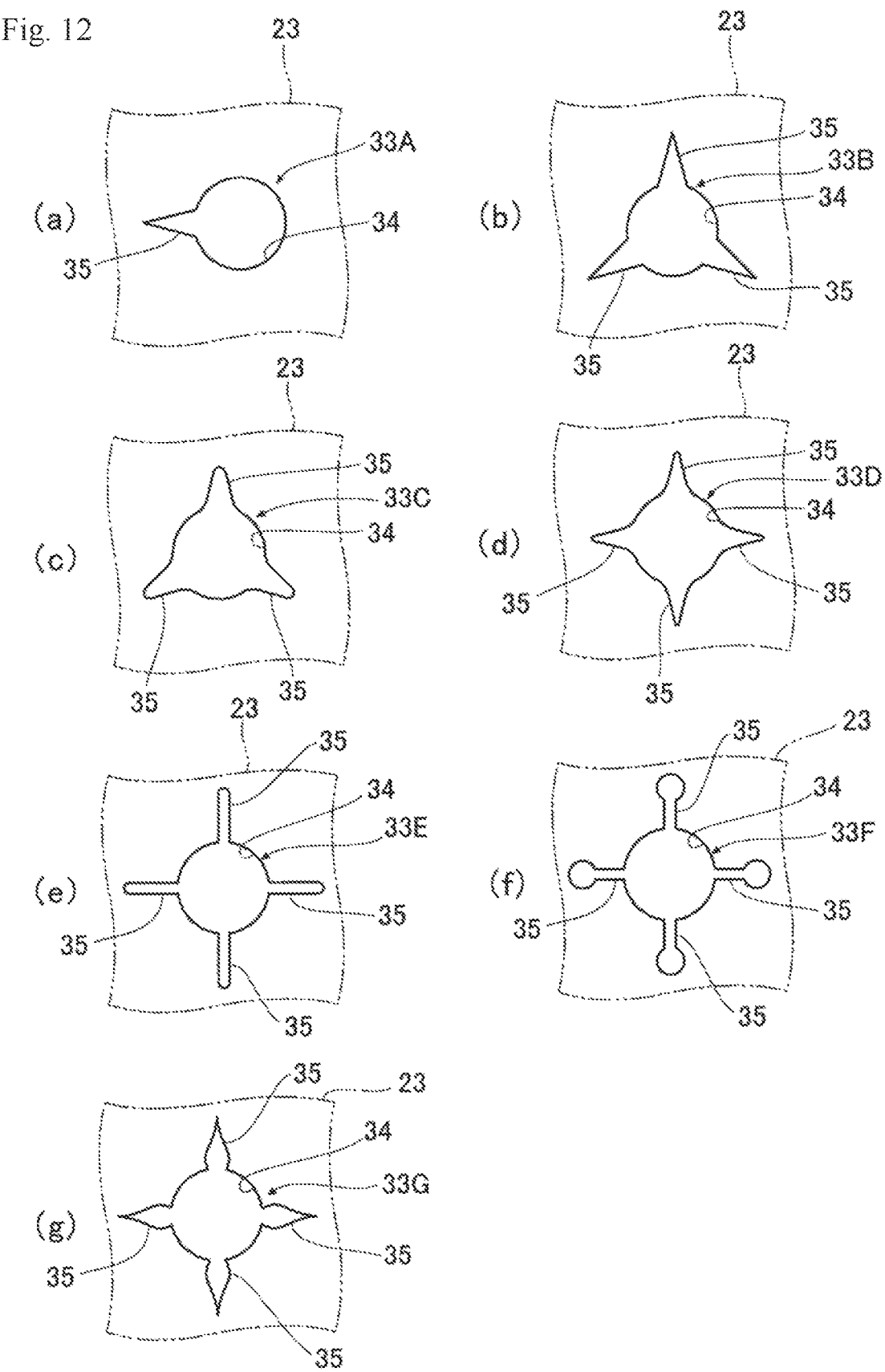
FIG. 12 illustrates other shapes of the opening in the valve device, in which (a) of FIG. 12 is an illustrative view of a first other shape, (b) of FIG. 12 is an illustrative view of a second other shape, (c) of FIG. 12 is an illustrative view of a third other shape, (d) of FIG. 12 is an illustrative view of a fourth other shape, (e) of FIG. 12 is an illustrative view of a fifth other shape, (f) of FIG. 12 is an illustrative view of a sixth other shape, and (g) of FIG. 12 is an illustrative view of a seventh other shape.

Openings 33A to 33G in (a) to (g) of FIG. 12 are common in that the first opening 34 is circular.

In the opening 33A of (a) of FIG. 12, a substantially triangular second opening 35 extends outward from one position on the outer periphery of the first opening 34. In the opening 33B of (b) of FIG. 12, three second openings 35 each having a substantially triangular shape extend from the outer periphery of the first opening 34 at equal intervals in the circumferential direction. In the opening 33C of (c) of FIG. 12, three second openings 35 each having a substantially triangular shape extend from the outer periphery of the first opening 34 at equal intervals in the circumferential direction, and each tip end of the second openings 35 has a circular arc shape. In the opening 33D of (d) of FIG. 12, four second openings 35 each having a substantially triangular shape extend from the outer periphery of the first opening 34 at equal intervals in the circumferential direction, and each tip end of the second openings 35 has a circular arc shape.

In the opening 33E of (e) of FIG. 12, four second openings 35 each having a shape of an elongated groove having a fixed width extend from the outer periphery of the first opening 34 at equal intervals in the circumferential direction, and each tip end of the second openings 35 has a circular arc shape. In the opening 33F of (f) of FIG. 12, four second openings 35 each having a shape of an elongated groove having a fixed width extend from the outer periphery of the first opening 34 at equal intervals in the circumferential direction, and a diameter-expanded circular shape is provided at each tip end of the second openings 35. In the opening 33G of (g) of FIG. 12, four second openings 35 each having a shape like a pen tip of a fountain pen, in which a base end portion thereof is in a diameter-expanded circular arc shape and a tip end portion thereof is in a tapered shape, extend from the outer periphery of the first opening 34 at equal intervals in the circumferential direction.

Figure 13:
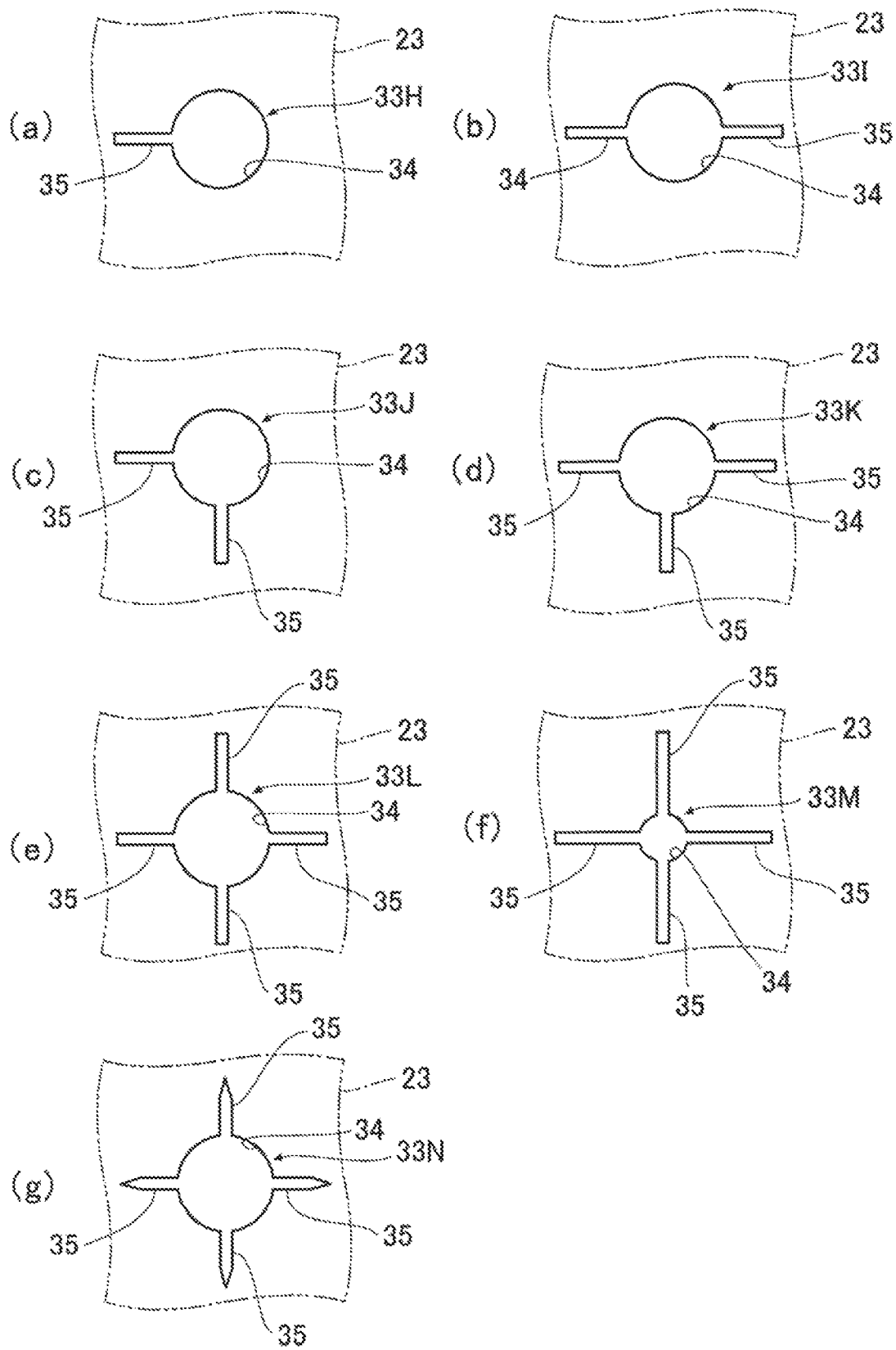
FIG. 13 illustrates other shapes of the opening in the valve device, in which (a) of FIG. 13 is an illustrative view of an eighth other shape, (b) of FIG. 13 is an illustrative view of a ninth other shape, (c) of FIG. 13 is an illustrative view of a tenth other shape, (d) of FIG. 13 is an illustrative view of an eleventh other shape, (e) of FIG. 13 is an illustrative view of a twelfth other shape, (f) of FIG. 13 is an illustrative view of a thirteenth other shape, and (g) of FIG. 13 is an illustrative view of a fourteenth other shape.

Openings 33H to 33N in (a) to (g) of FIG. 13 are common in that the first opening 34 is circular and the second opening 35 is in a shape of an elongated groove having a fixed width.

In the opening 33H of (a) of FIG. 13, a second opening 35 having a shape of an elongated groove extends from one position on the outer periphery of the first opening 34. In the opening 33I of (b) of FIG. 13, a pair of second openings 35 and 35 each having a shape of an elongated groove extends from facing positions of the outer periphery of the first opening 34. In the opening 33J of (c) of FIG. 13, second openings 35 and 35 each having a shape of an elongated groove extend from two positions on the outer periphery of the first opening 34, being spaced with an angle of 90 degrees in the circumferential direction. In the opening 33K of (d) of FIG. 13, second openings 35 each having a shape of an elongated groove extend from three positions on the outer periphery of the first opening 34, being spaces with an angle of 90 degrees in the circumferential direction.

In the opening 33L of (e) of FIG. 13, four second openings 35 each having a shape of an elongated groove extend from the outer periphery of the first opening 34 and are spaced apart at equal intervals in the circumferential direction. The opening 33M of (f) of FIG. 13 has a first opening 34 having a smaller diameter than the first opening 34 shown in (e) of FIG. 13, and four second openings 35 each having a shape of an elongated groove extend from the outer periphery thereof at equal intervals in the circumferential direction. In the opening 33N of (g) of FIG. 13, four second openings 35 each having a shape of an elongated groove extend from the outer periphery of the first opening 34 at equal intervals in the circumferential direction, and each tip end of the second openings 35 has a tapered shape.

Figure 14:
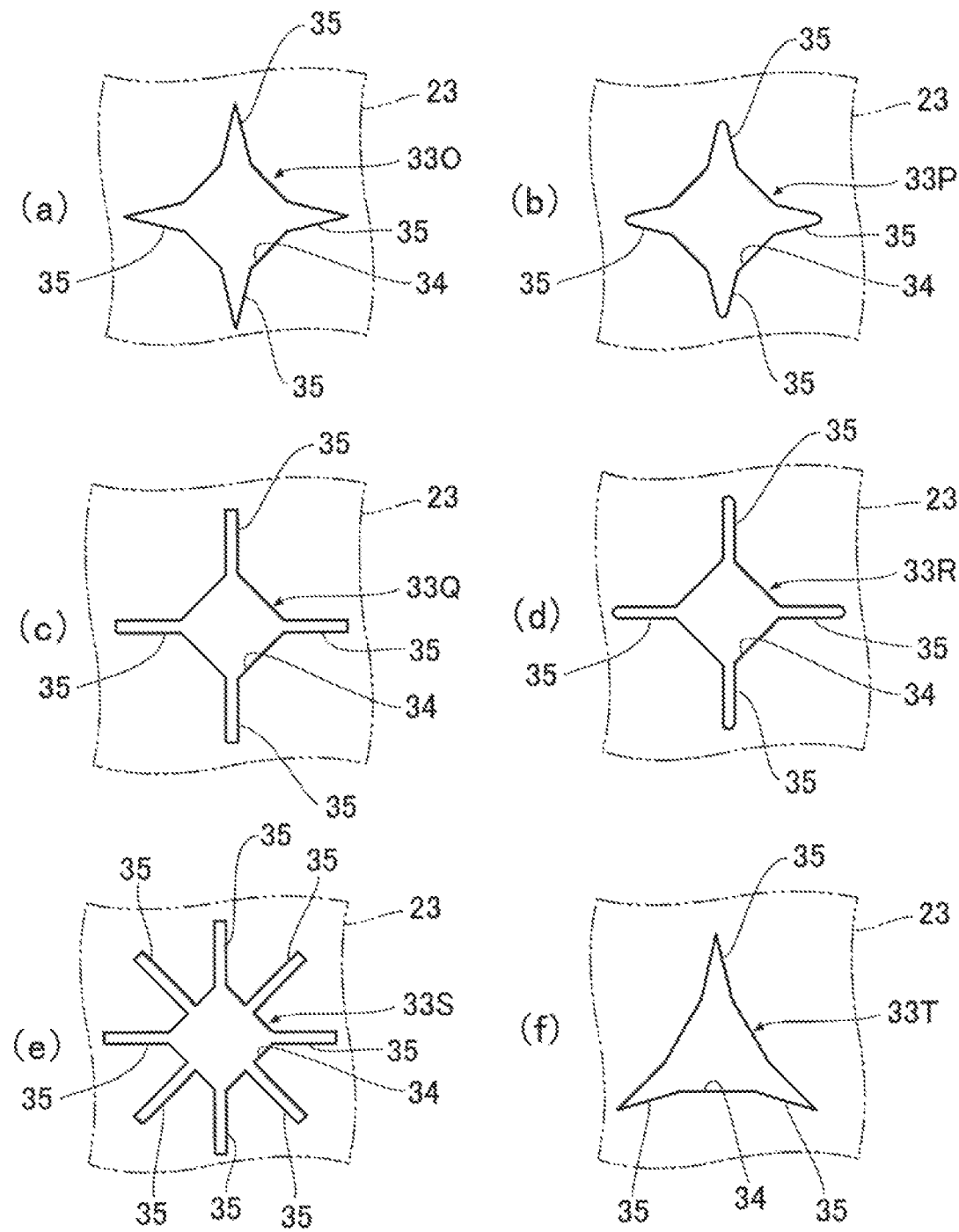
FIG. 14 illustrates other shapes of the opening in the valve device, in which (a) of FIG. 14 is an illustrative view of a fifteenth other shape, (b) of FIG. 14 is an illustrative view of a sixteenth other shape, (c) of FIG. 14 is an illustrative view of a seventeenth other shape, (d) of FIG. 14 is an illustrative view of an eighteenth other shape, (e) of FIG. 14 is an illustrative view of a nineteenth other shape, and (f) of FIG. 14 is an illustrative view of a twentieth other shape.

Openings 33O to 33T in (a) to (g) of FIG. 14 are common in that the first opening 34 has a polygonal shape.

In the opening 33O of (a) of FIG. 14, four second openings 35 each having a substantially triangular shape extend from the outer periphery of the first opening 34 at equal intervals in the circumferential direction. In the opening 33P of (b) of FIG. 14, four second openings 35 each having a substantially triangular shape extend from the outer periphery of the first opening 34 at equal intervals in the circumferential direction, and each tip end of the second openings 35 has a circular arc shape. In the opening 33Q of (c) of FIG. 14, four second openings 35 each having a shape of an elongated groove having a fixed width extend from the outer periphery of the first opening 34 at equal intervals in the circumferential direction. In the opening 33R of (d) of FIG. 14, four second openings 35 each having a shape of an elongated groove having a fixed width extend from the outer periphery of the first opening 34 at equal intervals in the circumferential direction, and each tip end of the second openings 35 has a circular arc shape. In the opening 33S of (e) of FIG. 14, eight second openings 35 each having a shape of an elongated groove having a fixed width extend from the outer periphery of the first opening 34 at equal intervals in the circumferential direction. In the opening 33T of (f) of FIG. 14, three second openings 35 each having a substantially triangular shape extend from the outer periphery of the first opening 34 at equal intervals in the circumferential direction.

Figure 15:
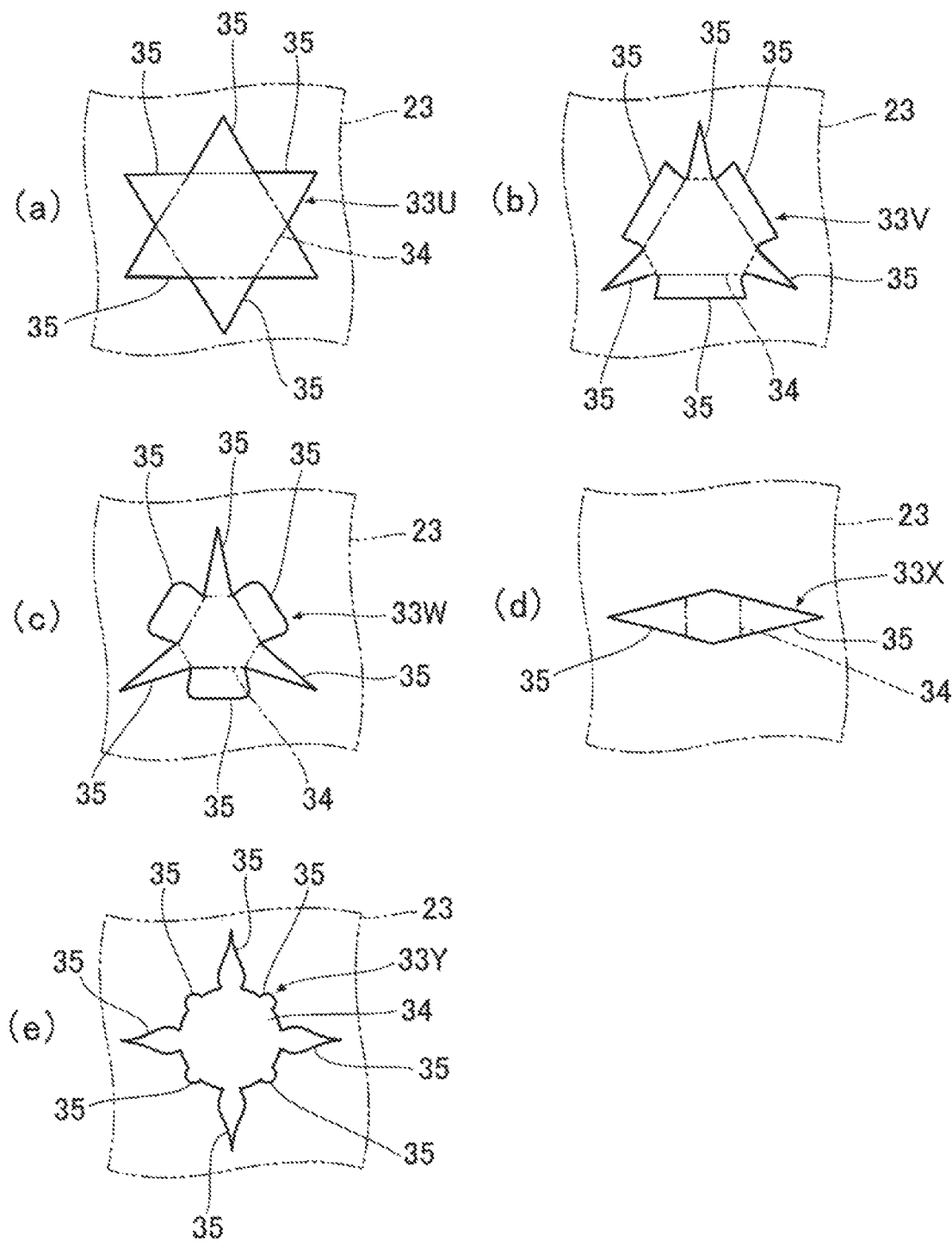
FIG. 15 illustrates other shapes of the opening in the valve device, in which (a) of FIG. 15 is an illustrative view of a twenty first other shape, (b) of FIG. 15 is an illustrative view of a twenty second other shape, (c) of FIG. 15 is an illustrative view of a twenty third other shape, (d) of FIG. 15 is an illustrative view of a twenty fourth other shape, and (e) of FIG. 15 is an illustrative view of a twenty fifth other shape.

Openings 33U to 33Y of (a) to (e) of FIG. 15 have different shapes from those in FIGS. 12 to 14.

In the opening 33U of (a) of FIG. 15, the first opening 34 has a regular hexagonal shape (see a two-dot chain line), and a second opening 35 having a substantially triangular shape extends from each surface of the first opening 34. In the opening 33V of (b) of FIG. 15, the first opening 34 has an irregular hexagonal shape (see a two-dot chain line), and a second opening 35 having a substantially triangular shape or a substantially quadrangular shape extends from each surface of the first opening 34. In the opening 33W of (c) of FIG. 15, the first opening 34 has an irregular hexagonal shape (see a two-dot chain line), a second opening 35 having a substantially triangular shape or a substantially quadrangular shape extends from each surface of the first opening 34, and a corner portion of the second opening 35 having a substantially quadrangular shape is has a R-shape.

In the opening 33X of (d) of FIG. 15, the first opening 34 has a hexagonal shape (see a two-dot chain line), and a pair of second openings 35 and 35 each having a substantially triangular shape extends from facing surfaces of the first opening 34. In the opening 33Y of (e) of FIG. 15, the first opening 34 has a circular shape, and four second openings 35 each having a shape like a pen tip of a fountain pen, as that in (g) of FIG. 12, extend from the outer periphery of the first opening 34 at equal intervals in the circumferential direction, and four second openings 35 each having a circular arc shape extend from the outer periphery of the first opening 34 at equal intervals in the circumferential direction, between the four second openings 35.

As described above, the opening in the present invention may have any shape as long as it has a first opening and a second opening that extends from an outer periphery of the first opening so as to have a slit shape and that extends continuously from the first opening.

Figure 4:
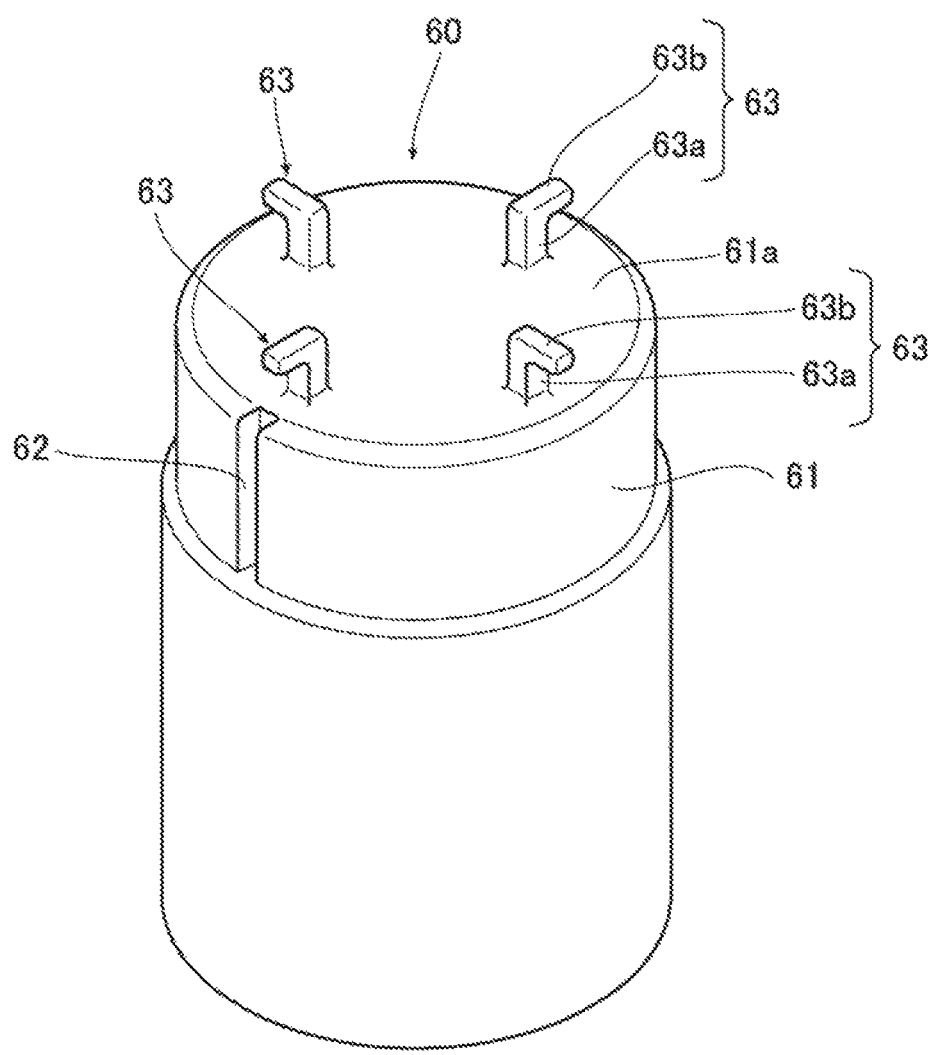
FIG. 4 is a perspective view of a float valve constituting the valve device.

Further, the float valve 60 is disposed in the valve chamber V so as to be able to move up and down. As illustrated in FIGS. 1 and 4, the float valve 60 has a substantially cylindrical shape with an upper portion thereof blocked, and includes a head portion 61 having an upper surface 61a having a flat surface shape. As illustrated in FIG. 4, a plurality of hooks 63 (four in this case) each having a substantially L shape in a reversed orientation are provided on the upper surface 61a of the head portion 61 at equal intervals in a circumferential direction. The hook 63 includes a columnar portion 63a, which is erected at a predetermined height from the upper surface 61a of the head portion 61, and a claw portion 63b that perpendicularly extends from an upper end of the columnar portion 63a toward a radially outer side of the head portion 61. A coil spring may be interposed between the float valve 60 and the cap 55 to apply a biasing force to the float valve 60.

A rotation restricting groove 62 extending in a recessed groove shape along an axial direction of the float valve 60 is formed at a predetermined position on an outer periphery of the head portion 61. The rotation restricting projection 47 (see FIG. 2) provided on the inner periphery of the upper portion of the housing body 20 is inserted into the rotation restricting groove 62, so that rotation of the float valve 60 with respect to the housing 15 is restricted. Further, the plurality of guide projections 48 (see FIG. 2) provided on the inner periphery of the upper portion of the housing body 20 are arranged on the outer periphery of the head portion 61, so that inclination of the float valve 60 at the time of moving up and down is suppressed.

Further, the seal part 65 having elasticity is disposed on the upper surface 61a of the head portion 61. As illustrated in FIG. 1, the seal part 65 in this embodiment includes a main body portion 67 having a substantially square shape and disposed at a center of the upper surface 61a of the head portion 61, and four extending portions 69 each extending toward an outer side from a side portion of the main body portion 67 by a fixed length, and has a substantially cross-like plate shape. The main body portion 67 contacts with and separates from the first opening 34 side of the valve seat 31 to close and open the first opening 34 of the opening 33, while the plurality of extending portions 69 contact with and separate from the second opening 35 side of the valve seat 31 to close and open the plurality of second openings 35 of the opening 33 (see FIGS. 5 to 10).

The main body portion 67 and the plurality of extending portions 69 of the seal part 65 are integrally formed from an elastic material such as rubber or an elastic elastomer so as to have the same thickness. The seal part 65 is formed so as to have a thickness smaller than a distance between the upper surface 61a of the head portion 61 and a locking surface (a surface facing the upper surface 61a of the head portion 61) of the claw portion 63b of the head portion 61. Further, at a tip end side of each extending portion 69 in an extending direction, a hook hole 69a is formed which has a long hole shape extending along the extending direction, and into which the columnar portion 63a of the hook 63 is inserted, and to which the claw portion 63b can be locked.

The seal part may have, for example, a circular plate shape, an elliptical shape, an oval shape, or a polygonal shape such as a quadrangular shape, a pentagonal shape, a hexagonal shape, or the like, and the thickness thereof may partially vary (for example, the main body portion thereof is made thick and the extending portion thereof is made thin). The seal part is not particularly limited, as long as it has elasticity and can contact with and separate from the valve seat to close and open the first opening and the second opening.

Further, as illustrated in FIG. 4, by inserting each hook 63 into the hook hole 69a of each extending portion 69 to dispose the claw portion 63b at a peripheral edge of the hook hole 69a, the seal part 65 is movably disposed so as to contact with and separate from the upper surface 61a of the head portion 61 as illustrated in FIGS. 5 to 10. The seal part 65 contacts with and separates from the valve seat 31 of the partition wall 23 to close and open the opening 33, thereby allowing the valve chamber V and the vent chamber R to communicate with each other via the vent hole 25, or restricting communication between the valve chamber V and the vent chamber R via the vent hole 25.

Specifically, first, in a normal state where the float valve 60 is not immersed in the fuel and disposed on a lower side of the valve chamber V, the seal part 65 is placed on the upper surface 61a of the head portion 61 (see FIG. 5). When the float valve 60 is immersed in the fuel due to sloshing of the fuel or the like to generate buoyancy and is lifted by the buoyancy, the seal part 65 moves accordingly to conic into contact with the valve seat 31 provided in the partition wall 23 and closes the opening 33 (see FIG. 6). Here, as illustrated in FIG. 7, the main body portion 67 of the seal part 65 comes into contact with the first opening 34 side of the valve seat 31 to block the first opening 34, while the base end portions of the plurality of extending portions 69 come into contact with the second opening 35 side of the valve seat 31 to block the plurality of second openings 35 respectively.

Figure 8:
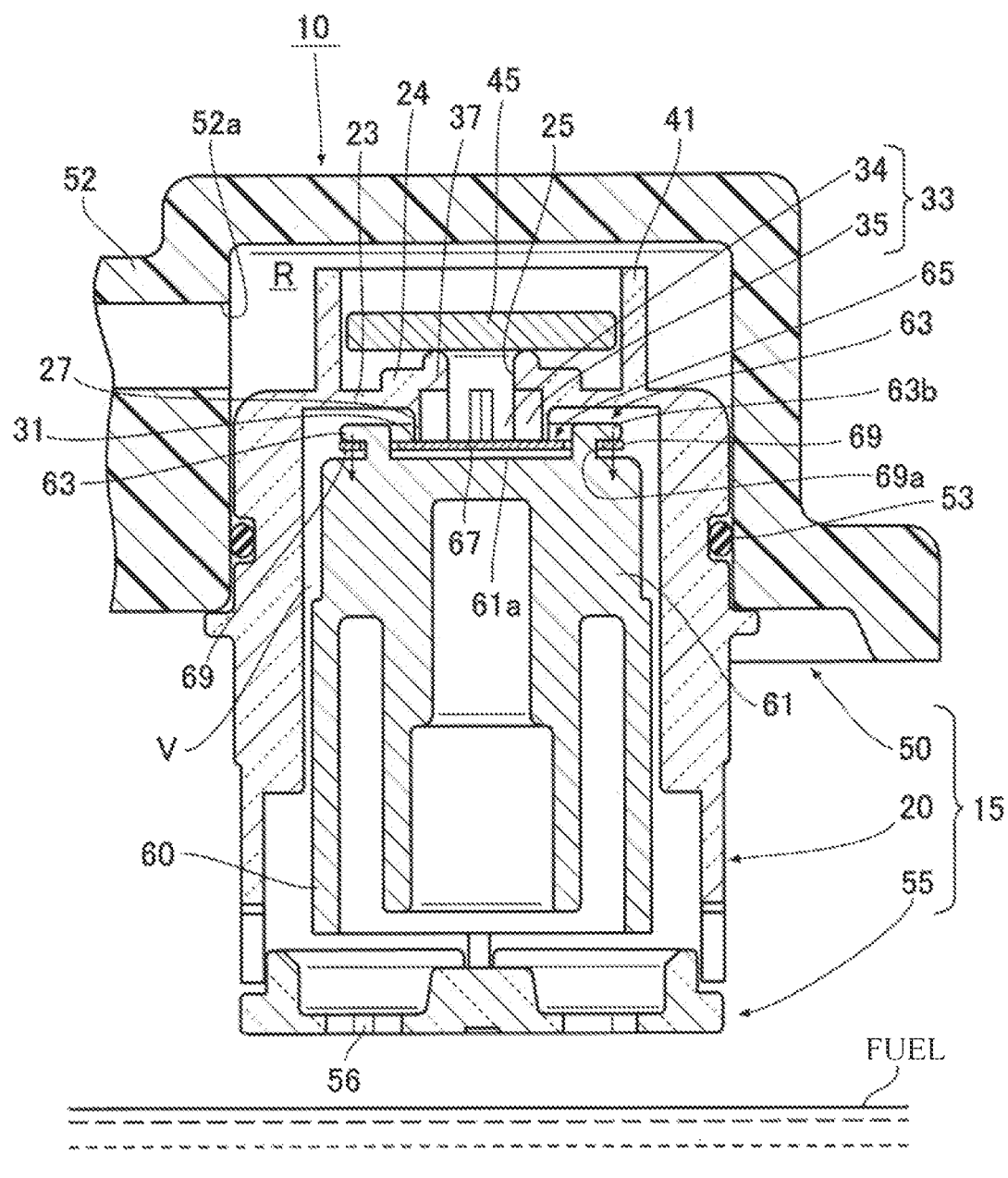
FIG. 8 is a cross-sectional view of the valve device in a state where the float valve is about to be lowered from a state where the float valve closes the vent hole.
Figure 9:
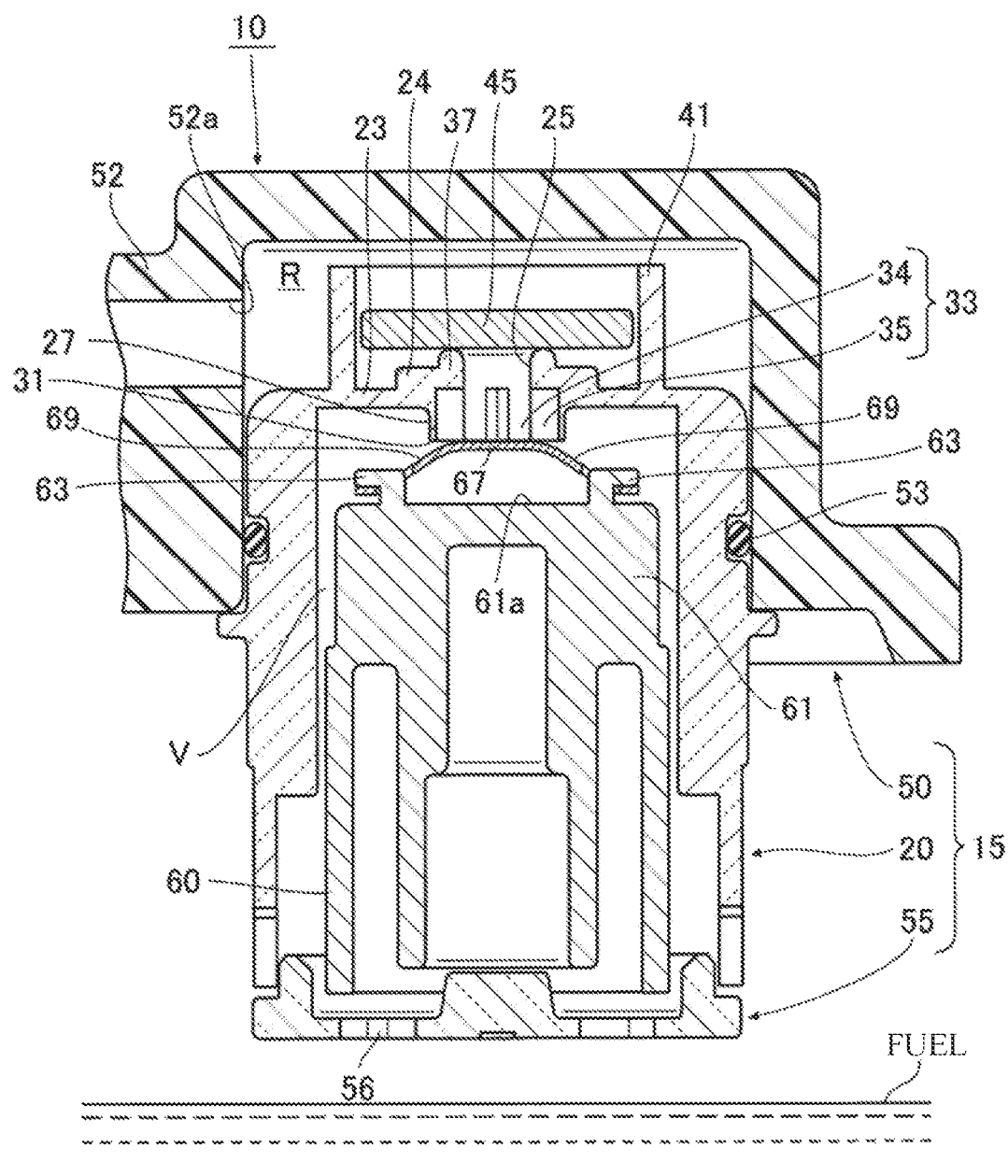
FIG. 9 is a cross-sectional view illustrating a state where the float valve is further lowered from the state of FIG. 8.

In this state, when the sloshing of the fuel or the like stops and there is no buoyancy from the fuel applied to the float valve 60, the float valve 60 is lowered by its own weight. In this case, as illustrated in FIG. 8, the float valve 60 is lowered by a predetermined distance with respect to the seal part 65 that is in contact with and stuck to the valve seat 31, the claw portions 63b of the hook 63 are locked to the peripheral edges of the hook holes 69a of the extending portions 69 of the seal part 65, and load of the float valve 60 is intensively applied to the extending portions 69 as indicated by arrows in FIG. 8. Then, as illustrated in FIGS. 9 and 10, the plurality of extending portions 69 are elastically deformed in a manner of being pulled obliquely downward with respect to the main body portion 67 stuck to the first opening 34 side of the valve seat 31, and the base end side of each extending portion 69 is gradually separated from a portion of the valve seat 31 on the second opening 35 side. Further, when each extending portion 69 is separated from the second opening 35 side of the valve seat 31, the load of the float valve 60 is applied to the main body portion 67 of the seal part 65 via the plurality of extending portions 69, and the main body portion 67 stuck to the first opening 34 side of the valve seat 31 is easily peeled off from the valve seat 31.

As described above, in this embodiment, since the seal part 65 having elasticity is disposed so as to be movable with respect to the float valve 60, as described above, the load of the float valve 60 easily is applied to the extending portion 69 of the seal part 65 when the float valve 60 is lowered. However, even in a case where the seal part 65 is not movable with respect to the float valve 60, the seal part 65 is easily peeled off from the opening 33 when the float valve is lowered.

That is, in a case of a configuration in which the seal part 65 does not move with respect to the float valve 60, when there is no buoyancy applied to the float valve 60 and the float valve 60 is about to be lowered from a state where the seal part 65 is in contact with the valve seat 31, a portion of the seal part 65 on the second opening 35 side of the valve seat 31 is elastically deformed with respect to a portion of the seal part 65 stuck to the first opening 34 side of the valve seat 31 and is peeled off from the second opening 35 side of the valve seat 31. Thereafter, the portion of the seal part 65 stuck to the first opening 34 side of the valve seat 31 is easily peeled off so that the first opening 34 can be opened.

Next, effects of the valve device 10 having the above configurations according to the present invention will be described.

As illustrated in FIG. 5, in a state where a fuel liquid level in the fuel tank does not rise and the float valve 60 is not immersed in the fuel, the float valve 60 is lowered in the valve chamber V, the opening 33 is opened, and the valve chamber V and the vent chamber R communicate with each other via the vent hole 25. At this time, in the valve device 10, since the opening 33, which is provided on the inner side of the valve seat 31 and is in communication with the vent hole 25, has the first opening 34 and the second opening 35 extending outward in a slit shape from the outer periphery thereof, the opening on the valve chamber V side of the vent hole 25 can be widened with both the first opening 34 and the second opening 35, and a ventilation volume between the valve chamber V and the vent chamber R can be increased.

Further, when the fuel vapor in the fuel tank increases due to vehicle running or the like in the above state and the internal pressure of the tank rises, the fuel vapor flows into the valve chamber V from the through holes 56 of the cap 55 and the through holes 21a of the housing body 20, then flows into the vent chamber R through the opening 33 and the vent hole 25, and is sent to a canister (not shown) via the fuel vapor piping 52 to suppress a rise in pressure in the fuel tank.

Figure 6:
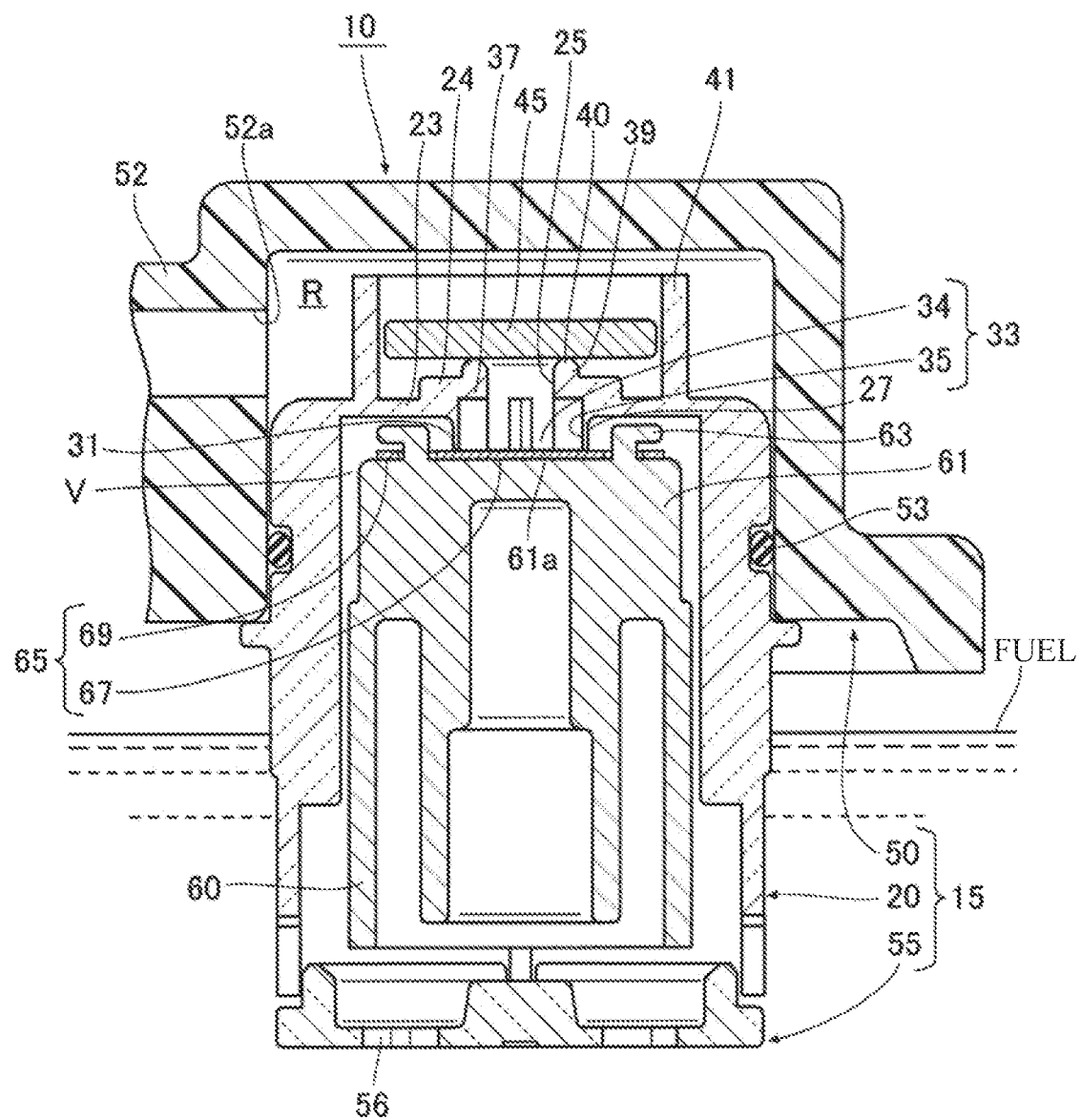
FIG. 6 is a cross-sectional view of the valve device in a state where the float valve is lifted and the vent hole is closed.

Further, when the vehicle goes round a curve, runs on an uneven road or a slope or the like or turns over due to an accident, the fuel in the fuel tank sloshes violently, the fuel liquid level rises, and the float valve 60 is immersed in the fuel, in this state, the float valve 60 is lifted by the buoyancy applied thereto, and as illustrated in FIGS. 6 and 7, the main body portion 67 of the seal part 65 comes into contact with the first opening 34 side of the valve seat 31 to block the first opening 34, and the plurality of extending portions 69 come into contact with the second opening 35 side of the valve seat 31 to block the plurality of second openings 35 respectively.

In this state, when the sloshing of the fuel or the like stops and there is no buoyance from the fuel applied to the float valve 60, the float valve 60 is lowered by its own weight and the float valve 60 is lowered by a predetermined distance with respect to the seal part 65 as described above. Further, as illustrated in FIGS. 9 and 10, each of the plurality of extending portions 69 is elastically deformed with respect to the main body portion 67 and each extending portion 69 can be peeled off from the second opening 35 side of the valve seat 31, and in response to the peeling of the extending portion 69, the main body portion 67 stuck to the first opening 34 side of the valve seat 31 can be easily peeled off from the valve seat 31 as described above, and the opening 33 can be fully opened again as illustrated in FIG. 5.

As described above, in the valve device 10, since the opening 33 has the first opening 34 and the second opening 35 extending outward in a slit shape from the outer periphery thereof, as described above, the ventilation volume between the valve chamber V and the vent chamber R can be secured with the first opening 34 and the second opening 35 in a case where the float valve 60 is lowered. On the other hand, when there is no buoyance applied to the float valve 60 from a state where the float valve 60 is lifted by buoyance due to fuel immersion caused by fuel sloshing or the like and the seal part 65 comes into contact with the valve seat 31, the seal pan 65 can be easily peeled off from the second opening 35 side of the valve seat 31 by the second opening 35 extending in a slit shape and the valve reopening pressure can be increased. That is, even when the pressure in the fuel tank is high, the float valve 60 can be easily peeled off from the valve seat 31 to open the vent hole 25. As a result, it is possible to easily maintain air permeability and increase a valve reopening pressure.

In addition, in this embodiment, as illustrated in FIGS. 2 and 3, the second opening 35 is formed to be narrow at the tip end side in the extending direction thereof. Therefore, when there is no buoyance applied to the float valve 60 from a state where the float valve 60 is lifted and the seal part 65 comes into contact with the valve seat 31, the seal part 65 can be more easily peeled off from the second opening 35 side of the valve seat 31, and the valve reopening pressure can be further increased. That is, when the tip end side of the second opening 35 is narrow, the seal part 65 having elasticity is easily peeled off at the time the float valve 60 being about to be lowered by its own weight. When the tip end side of the second opening 35 is wide, the seal part 65 having elasticity is easily stuck and is difficult to be peeled.

Further, in this embodiment, three or more second openings 35 constituting the opening 33 are provided and spaced apart at equal intervals in the circumferential direction of the first opening 34 (see FIG. 3). Therefore, when the float valve 60 is lowered in an inclined state, the seal part 65 can be easily peeled off from the second opening 35 side of the valve seat 31 regardless of the direction in which the float valve 60 is inclined, and the valve reopening pressure can be further increased.

Further, in this embodiment, as illustrated in (b) of FIG. 3, since the first opening 34 constituting the opening 33 has a circular shape and the second opening 35 is formed to be narrower than the radius r of the first opening 34, it is possible to more easily maintain the air permeability and increase the valve reopening pressure.

Further, in this embodiment, as illustrated in FIG. 3, the cylindrical wall 27 protrudes downward from the valve chamber V side of the partition wall 23, the tip end portion of the cylindrical wall 27 in the protruding direction constitutes the valve seat 31, and the cover portion 37 that covers only the interior end surface of the second opening 35 is provided at a predetermined position of the inner side of the valve seat 31 on the vent chamber R side. Therefore, when the fuel in the fuel tank violently sloshes and the fuel is about to be blown up toward the vent chamber R through the opening 33 and the vent hole 25 before the float valve 60 is lifted to come into contact with the valve seat 31 and to block the opening 33, the fuel can be caused to collide with the cover portion 37 and remain in a space surrounded by the cover portion 37 and the portion of the cylindrical wall 27 on the second opening 35 side (here, the second wall portion 29), and fuel inflow toward the vent chamber R can be suppressed. Further, since the cover portion 37 is provided, a projection (annular projection 39) constituting a valve seat can be easily provided from the vent chamber R side of the vent hole 25, and the check valve 45 that adjusts the pressure in the fuel tank can be easily disposed.

In this embodiment, as illustrated in FIGS. 4 and 7, the elastic seal part 65 disposed above the float valve 60 includes the main body portion 67 that covers the first opening 34 when the float valve 60 is lifted, and the extending portion 69 that extends outward from the main body portion 67 and that covers the second opening 35 when the float valve 60 is lifted. Therefore, even when it enters a state where the main body portion 67 is stuck to the first opening 34 side of the valve seat 31 when there is no buoyance applied to the float valve 60 from the state where the seal part 65 is in contact with the valve seat 31, as illustrated in FIGS. 9 and 10, the extending portion 69 can be easily elastically deformed with respect to the main body portion 67 and can be easily peeled off from the second opening 35 side of the valve seat 31, and the valve reopening pressure is further effectively increased.

FIGS. 16 to 22 illustrate other embodiment of a valve device according to the present invention. Substantially the same parts as those in the above-described embodiment are denoted by the same reference signs, and description thereof will be omitted.

In a valve device 10A of this embodiment, structures of the cylindrical wall and the valve seat are mainly different from those of the above-described embodiment.

Figure 16:
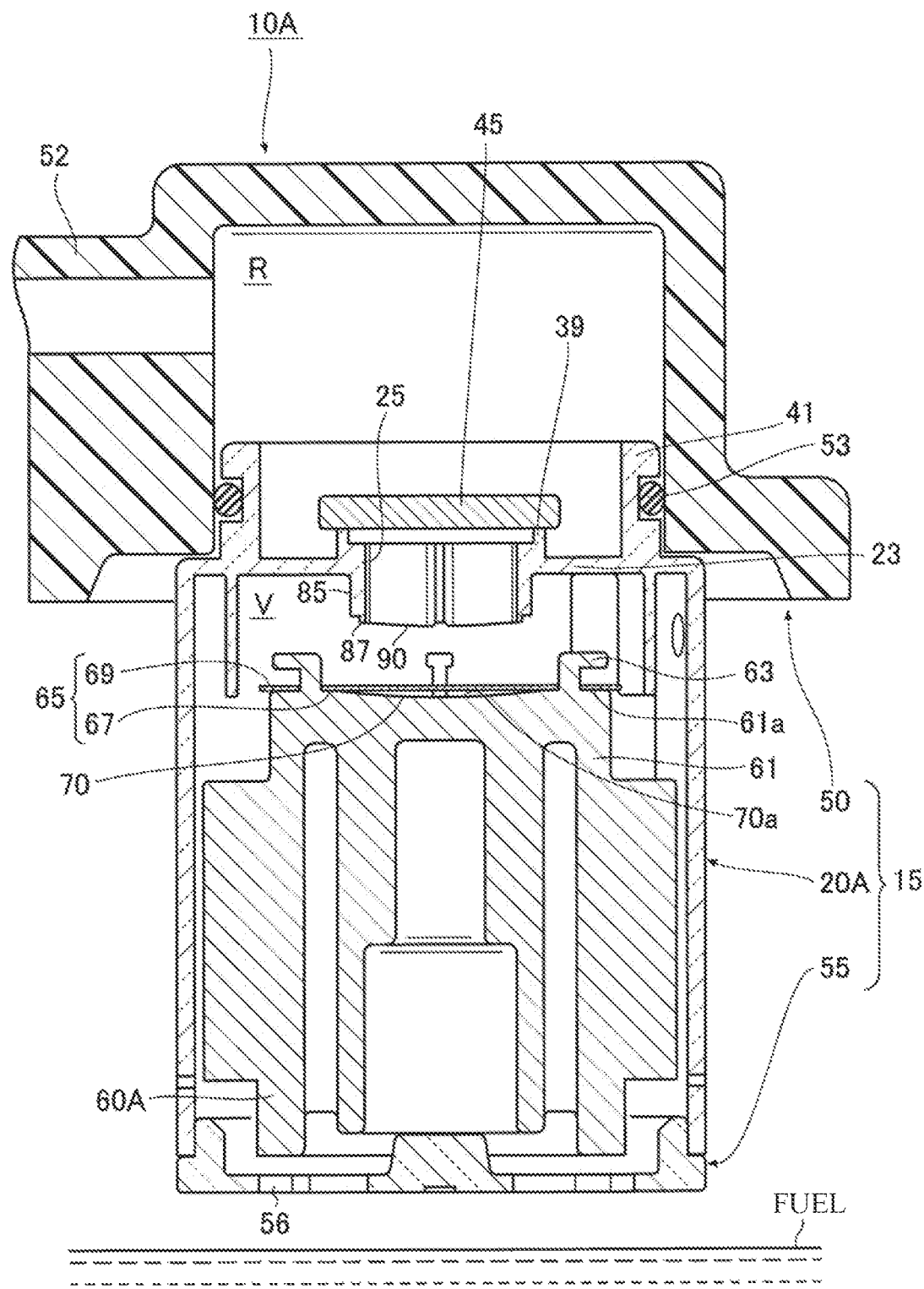
FIG. 16 is a cross-sectional view illustrating other embodiment of the fuel tank valve device according to the present invention, and illustrating a state where a float valve is lowered and a vent hole is opened.

As illustrated in FIG. 16, the partition wall 23 of a housing body 20A is formed with the vent hole 25 having a substantially cross-like slit shape as illustrated in (a) of FIG. 18. A cylindrical wall surrounding the vent hole 25 protrudes downward from the valve chamber V side (lower surface side) of the partition wall 23. The cylindrical wall of this embodiment includes a first cylindrical wall 85 that protrudes downward in a substantially cross-like frame shape from a peripheral edge of the vent hole 25 of the partition wall 23, and a second cylindrical wall 87 that protrudes downward in a substantially cross-like frame shape that is one size smaller than the first cylindrical wall 85 from a tip end portion of the first cylindrical wall 85 in a protruding direction. The cylindrical wall has a structure in which two walls each having cross-like frame shape are continuously provided.

The second cylindrical wall 87 includes a substantially cylindrical first wall portion 88 that is disposed at a position aligned with a center of the vent hole 25, and four second wall portions 89 that extend outward from an outer periphery of the first wall portion 88 at equal intervals in a circumferential direction. Tip end portions of these wall portions 88 and 89 in the protruding direction constitute a valve seat 90. On an inner side of the valve seat 90, the opening 33 communicating with the vent hole 25 is provided. As illustrated in (a) of FIG. 18, the opening 33 in this embodiment includes the first opening 34 having a substantially circular shape and four second openings 35 that each extend in a shape of an elongated slit groove having a fixed width, from an outer periphery of the first opening 34 at equal intervals in the circumferential direction.

Figure 17:
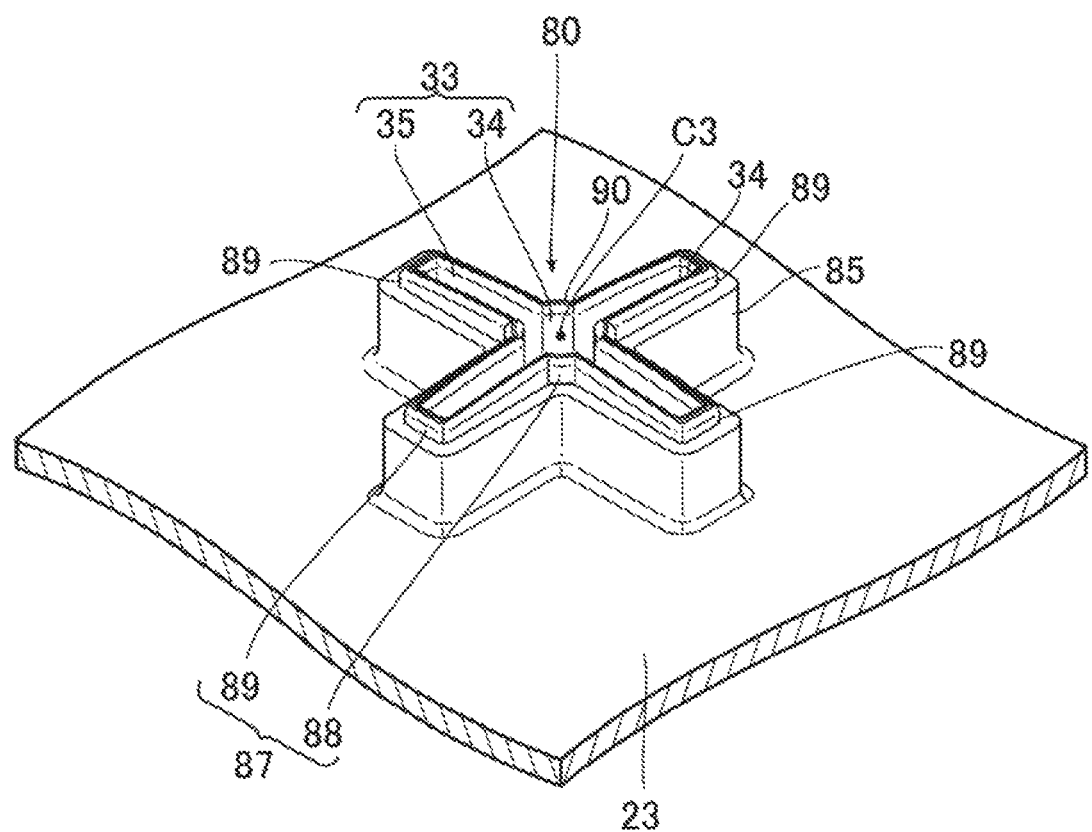
FIG. 17 is an enlarged perspective view of a cylindrical wall forming member constituting a cylindrical wall in the valve device.

As illustrated in FIG. 17 and (b) of FIG. 18, a protruding height of the valve seat 90 from the partition wall 23 is gradually reduced outward from a center C3 of the valve seat 90. That is, the valve seat 90 has a shape in which the center C3 side thereof largely protrudes downward and has a small height from an upper surface of a float valve, and has a shape in which a protruding amount thereof gradually decreases toward an outer side of the valve seat and the height from the upper surface of the float valve is large. Specifically, as illustrated in (b) FIG. 18, the valve seat 90 is provided such that: a protruding height H1 of the first wall portion 88 from a surface on the valve chamber side V side of the partition wall 23 (hereinafter, also simply referred to as a "lower surface") is maximum (protruding amount from the lower surface of the partition wall is large), the protruding height gradually decreases toward the outer side of the valve seat, and a protruding height H2 of the second wall portion 89 from the lower surface of the partition wall 23 is minimum (protruding amount from the lower surface of the partition wall is small). Further, the valve seat 90 is formed so as to have a gentle curved surface shape and gradually lower from the center C3 toward the outer side of the valve seat (see (b) of FIG. 18).

In the valve device 10A, as illustrated in FIG. 19, when a float valve 60A is lifted and the seal part 65 comes into contact with the valve seat 90, the seal part 65 is elastically deformed in accordance with a protruding shape of the valve seat 90 to come into contact with the protruding shape of the valve seat 90. That is, at the time when the seal part 65 comes into contact with the valve seat 90, the main body portion 67 of the seal part 65 comes into contact with a most downwardly protruding portion (first opening 34 side) of the valve seat 90, and each extending portion 69 of the seal part 65 comes into contact with a portion (second opening 35 side) of the valve seat 90, which has the gentle curved surface shape from the center C3 toward the outer side and whose protruding height gradually decreases from the center C3 toward the outer side. Accordingly, as illustrated in FIG. 20, each extending portion 69 is elastically deformed so that the gentle curved surface shape is presented and a height from the upper side of the float valve gradually increases from a center of the seal part toward the outer side, and as a result, the extending portion 69 of the seal part 65 is obliquely in contact with the valve seat 90.

Although the partition wall in this embodiment has a structure in which a cylindrical wall having a valve seat gradually lowering from a center of the valve seat toward an outer side is integrally projected from a partition wall of the housing body, a member separate from the housing body 20A may be provided and a partition wall may be provided in the separate member. The cylindrical wall has a two-step structure of the first cylindrical wall 85 and the second cylindrical wall 87, however, the cylindrical wall may have a protruding shape without a step from the lower surface side of the partition wall to the tip end in the protruding direction. Further, although the valve seat 90 of this embodiment is formed so as to have a gentle curved surface shape and gradually lower from the center C3 toward the outer side of the valve seat, for example, the valve seat 90 may be formed so as to have a tapered surface shape and gradually lower from the center of the valve seat toward the outer side of the valve seat, and is not particularly limited.

On the other hand, a recess 70 aligned with the protruding shape of the valve seat 90 is provided above the float valve 60A in this embodiment. As illustrated in FIG. 16, the recess 70 in this embodiment is formed on the upper surface 61a of the head portion 61 of the float valve 60A, and has a concave shape so that an inner surface 70a thereof has a gentle curved surface shape which is deepest at a center of the float valve and becomes gradually shallower toward an outer side of the float valve.

Further, when the float valve 60A is lifted and the seal part 65 is elastically deformed in accordance with the protruding shape of the valve seat 90 and comes into contact therewith as illustrated in FIG. 19, the seal part 65 enters the recess 70, the main body portion 67 thereof comes into close contact with a deepest portion of the inner surface 70a of the recess 70 and each extending portion 69 comes into close contact with a curved portion of the inner surface 70a of the recess 70, and a gap between the valve seat 90 and the recess 70 in the upper side of the float valve 60A is sealed by the seal part 65, as illustrated in FIG. 20.

Although the recess 70 in this embodiment is provided to be a recess 70 whose inner surface 70a has a curved surface shape so as to be aligned with the protruding shape of the valve seat 90, for example, the recess may be recessed in a substantially polygonal shape.

Next, effects of the valve device 10A having the above configurations will be described.

That is, in this embodiment, the protruding height of the valve seat 90 from the partition wall 23 is provided so as to gradually decrease outward from the center C3 of the valve seat 90. Therefore, when the float valve 60A is immersed in the fuel and is lifted due to sloshing of the fuel or the like and the seal part 65 comes into contact with the valve seat 90 as illustrated in FIG. 19, from a state where the float valve 60A is not immersed in the fuel as illustrated in FIG. 16, the main body portion 67 comes into contact with the most downwardly protruding portion of the valve seat 90. At the same time, each extending portion 69 of the seal part 65 comes into contact with the portion of the valve seat 90, which has the gentle curved surface shape from the center C3 toward the outer side and whose protruding height gradually decreases from the center C3 toward the outer side. Thus, as illustrated in FIG. 20, each extending portion 69 is elastically deformed so that the gentle curved surface shape is presented and the height from the upper side of the float valve gradually increases from the center of the seal part toward the outer side, and the extending portion 69 of the seal part 65 is obliquely in contact with the valve seat 90.

In this state, when the sloshing of the fuel or the like stops and there is no buoyance from the fuel applied to the float valve 60A, the float valve 60A is lowered by its own weight and the float valve 60A is lowered by a predetermined distance with respect to the seal part 65. Further, as illustrated in FIG. 21, each of the plurality of extending portions 69 is elastically deformed with respect to the main body portion 67 and a tensile force F1 (see (a) of FIG. 22) is applied to each extending portion 69. At this time, as illustrated in FIG. 22, a portion of the extending portion 69 of the seal part 65 is obliquely in contact with the valve seat 90. Therefore, as illustrated in an enlarged view of (b) of FIG. 22, the tensile force F1 is broken down into component forces in oblique directions and a peeling force F2 in an oblique direction is applied to an interface between the valve seat 90 and the extending portion 69 of the seal part 65. Therefore, the extending portion 69 of the seal part 65 can be more easily peeled off from the valve seat 90 and the valve reopening pressure can be further increased. When the valve seat and the seal part are in contact with each other in a horizontal direction without being obliquely in contact with each other, the tensile force applied to the seal part is not broken down due to the weight of the float valve and the peeling force in the oblique direction is not applied to the interface between the valve seat and the seal part, and thus performance of peeling the seal part from the valve seat is not improved.

Further, the valve seat 90 has the shape in which the center C3 side thereof largely protrudes downward and has the shape in which the protruding amount thereof gradually decreases toward the outer side of the valve seat. Accordingly when the float valve 60A is lifted and the seal part 65 comes into contact with the valve seat 90, first, the main body portion 67 of the seal part 65 comes into contact with the protruding portion on the center side of the valve seat 90, and thereafter each extending portion 69 of the seal part 65 is elastically deformed and comes into contact with an outer peripheral portion of the valve seat 90 accordingly. Therefore, trackability (likeliness of elastically deformation) of the seal part 65 with respect to the valve seat 90 can be improved and performance of sealing between the valve seat 90 and the seal part 65 can be improved.

Further, in this embodiment, as illustrated in FIG. 16, the recess 70 that is aligned with the protruding shape of the valve seat 90 is provided above the float valve 60A. Therefore, at the time of lowering the float valve 60A after being lifted, easiness of peeling the seal part 65 from the valve seat 90 can be secured by the peeling force F2 in the oblique direction that is applied to the interface between the valve seat 90 and the seal part 65. When the float valve 60A is lifted, the seal part 65 comes into contact with the valve seat 90 and the seal part 65 is elastically deformed in accordance with the protruding shape of the valve seat 90, as illustrated in FIG. 20, the lower surface of the seal part 65 comes into contact with the inner surface 70*a* of the recess 70 of the float valve 60A and the gap between the valve seal 90 and the float valve 60A is sealed by the seal part 65. Therefore, the performance of sealing between valve seat 90 and the seal part 65 can be improved.

The present invention is not limited to the embodiments described above, and various modified embodiments are possible within the scope of the present invention, and such embodiments are also included in the scope of the present invention.

REFERENCE SIGNS LIST

- 10, 10A valve device
- 15 housing
- 20, 20A housing body
- 23 partition wall
- 25 vent hole
- 27 cylindrical wall
- 31, 90 valve seat
- 33, 33A, 33B, 33C, 33D, 33E, 33F, 33G, 33H, 33I, 33J, 33K, 33L, 33M, 33N, 33O, 33P, 33Q, 33R, 33S, 33T, 33U, 33V, 33W, 33X, 33Y opening
- 34 first opening
- 35 second opening
- 37 cover portion
- 45 check valve
- 50 cover
- 53 seal ring
- 55 cap
- 60, 60A float valve
- 63 hook
- 65 seal part
- 67 main body portion
- 69 extending portion
- 70 recess
- R vent chamber
- V valve chamber

The invention claimed is:

1. A valve device, comprising:
a housing in which, via a partition wall, a valve chamber communicating with an inside of a fuel tank is provided below the partition wall and a vent chamber communicating with an outside of the fuel tank is provided above the partition wall, and a vent hole through which the valve chamber and the vent chamber communicate with each other is provided in the partition wall; and
a float valve that is accommodated in the valve chamber so as to be able to move up and down and that opens and closes the vent hole,
wherein a valve seat is formed on a side of the valve chamber of the partition wall, and an opening communicating with the vent hole is provided on an inner side of the valve seat,
wherein the opening includes a first opening and a second opening extending outward in a slit shape from at least one position of an outer periphery of the first opening,
wherein a seal part having elasticity that contacts with and separates from the valve seat to close and open the first opening and the second opening, is disposed above the float valve,
wherein a cylindrical wall protrudes downward from the side of the valve chamber of the partition wall, and a tip end portion of the cylindrical wall in a protruding direction constitutes the valve seat, and
wherein a cover portion that covers an interior end surface of the second opening, is provided at a predetermined position of the inner side of the valve seat on a side of the vent chamber.

2. The valve device according to claim 1,
wherein a tip end side of the second opening in an extending direction is formed to be narrow.

3. The valve device according to claim 1,
wherein three or more of the second openings are arranged at equal intervals in a circumferential direction of the first opening.

4. The valve device according to claim 1,
wherein the first opening has a circular shape, and the second opening is formed to be narrower than a radius of the first opening.

5. The valve device according to claim 1,
wherein the seal part includes a main body portion that covers the first opening when the float valve is lifted, and an extending portion that extends outward from the main body portion and that covers the second opening when the float valve is lifted.

6. The valve device according to claim 1,
wherein a cylindrical wall protrudes downward from the side of the valve chamber of the partition wall, and a tip end portion of the cylindrical wall in a protruding direction constitutes the valve seat, and
wherein a protruding height of the valve seat from the partition wall is set to gradually decrease from a center of the valve seat toward an outer side.

7. The valve device according to claim 6,
wherein a recess aligned with a protruding shape of the valve seat is provided above the float valve.

8. A valve device, comprising:
a housing in which, via a partition wall, a valve chamber communicating with an inside of a fuel tank is provided below the partition wall and a vent chamber communicating with an outside of the fuel tank is provided above the partition wall, and a vent hole through which the valve chamber and the vent chamber communicate with each other is provided in the partition wall; and
a float valve that is accommodated in the valve chamber so as to be able to move up and down and that opens and closes the vent hole,
wherein a valve seat is formed on a side of the valve chamber of the partition wall, and an opening communicating with the vent hole is provided on an inner side of the valve seat,
wherein the opening includes a first opening and a second opening extending outward in a slit shape from at least one position of an outer periphery of the first opening,
wherein a seal part having elasticity that contacts with and separates from the valve seat to close and open the first opening and the second opening, is disposed above the float valve, and
wherein the seal part has a substantially cross-like plate shape.

* * * * *